(12) United States Patent
Carlsen et al.

(10) Patent No.: US 8,504,853 B2
(45) Date of Patent: Aug. 6, 2013

(54) METHOD, APPARATUS, AND COMPUTER PROGRAM PRODUCT FOR CABLE DETECTION AND POWER NEGOTIATION

(75) Inventors: Sten Carlsen, Høje-Tåstrup (DK); Richard Jonathan Petrie, Surrey (GB)

(73) Assignee: Nokia Corporation, Espoo (FI)

( * ) Notice: Subject to any disclaimer, the term of this patent is extended or adjusted under 35 U.S.C. 154(b) by 280 days.

(21) Appl. No.: 13/110,120

(22) Filed: May 18, 2011

(65) Prior Publication Data
US 2012/0297207 A1 Nov. 22, 2012

(51) Int. Cl.
*G06F 1/00* (2006.01)
*H01R 29/00* (2006.01)
*H01R 4/62* (2006.01)

(52) U.S. Cl.
USPC .................. 713/300; 439/1; 439/43; 439/207

(58) Field of Classification Search
USPC ................................. 713/300; 439/1, 43, 207
See application file for complete search history.

(56) References Cited

U.S. PATENT DOCUMENTS

| | | | | |
|---|---|---|---|---|
| 5,884,086 | A * | 3/1999 | Amoni et al. | 713/300 |
| 6,665,801 | B1 | 12/2003 | Weiss | |
| 7,340,627 | B1 | 3/2008 | Harvey | |
| 2002/0169915 | A1 | 11/2002 | Wu | |
| 2005/0001179 | A1 | 1/2005 | Gisler et al. | |
| 2007/0167069 | A1 | 7/2007 | Murakami | |
| 2008/0126594 | A1 | 5/2008 | Monks et al. | |
| 2008/0178011 | A1 | 7/2008 | Hubo et al. | |
| 2008/0314979 | A1 | 12/2008 | Johnsen et al. | |
| 2009/0209131 | A1 * | 8/2009 | Murphy et al. | 439/607.35 |
| 2010/0299449 | A1 * | 11/2010 | Terlizzi | 709/237 |
| 2010/0313226 | A1 * | 12/2010 | Cholas et al. | 725/92 |
| 2011/0208980 | A1 * | 8/2011 | Brooks et al. | 713/300 |
| 2012/0078690 | A1 * | 3/2012 | Harriman et al. | 705/14.4 |

FOREIGN PATENT DOCUMENTS

EP 138176 2/2004

OTHER PUBLICATIONS

International Search Report for International Application No. PCT/FI2012/050309 mailed Sep. 21, 2012.

* cited by examiner

*Primary Examiner* — Vincent Tran
(74) *Attorney, Agent, or Firm* — Locke Lord LLP

(57) ABSTRACT

Method, apparatus, and computer program product embodiments of the invention are disclosed for negotiation protocols for power delivery from a first device to a connected second device. In example embodiments of the invention, a method comprises: determining whether a connector includes a cable indication that indicates its cable is capable of conducting an elevated power level above a level of a legacy cable; transmitting an offer to a device connected by the cable, to provide one or more supported power capabilities above the level of a legacy cable, if the cable indication is determined to indicate that the cable is capable of conducting an elevated power level above the level of a legacy cable; and transmitting an offer to a device connected by the cable, to provide the power level of a legacy cable, if the cable indication is determined to indicate that the cable is not capable of conducting an elevated power level above the level of a legacy cable.

24 Claims, 21 Drawing Sheets

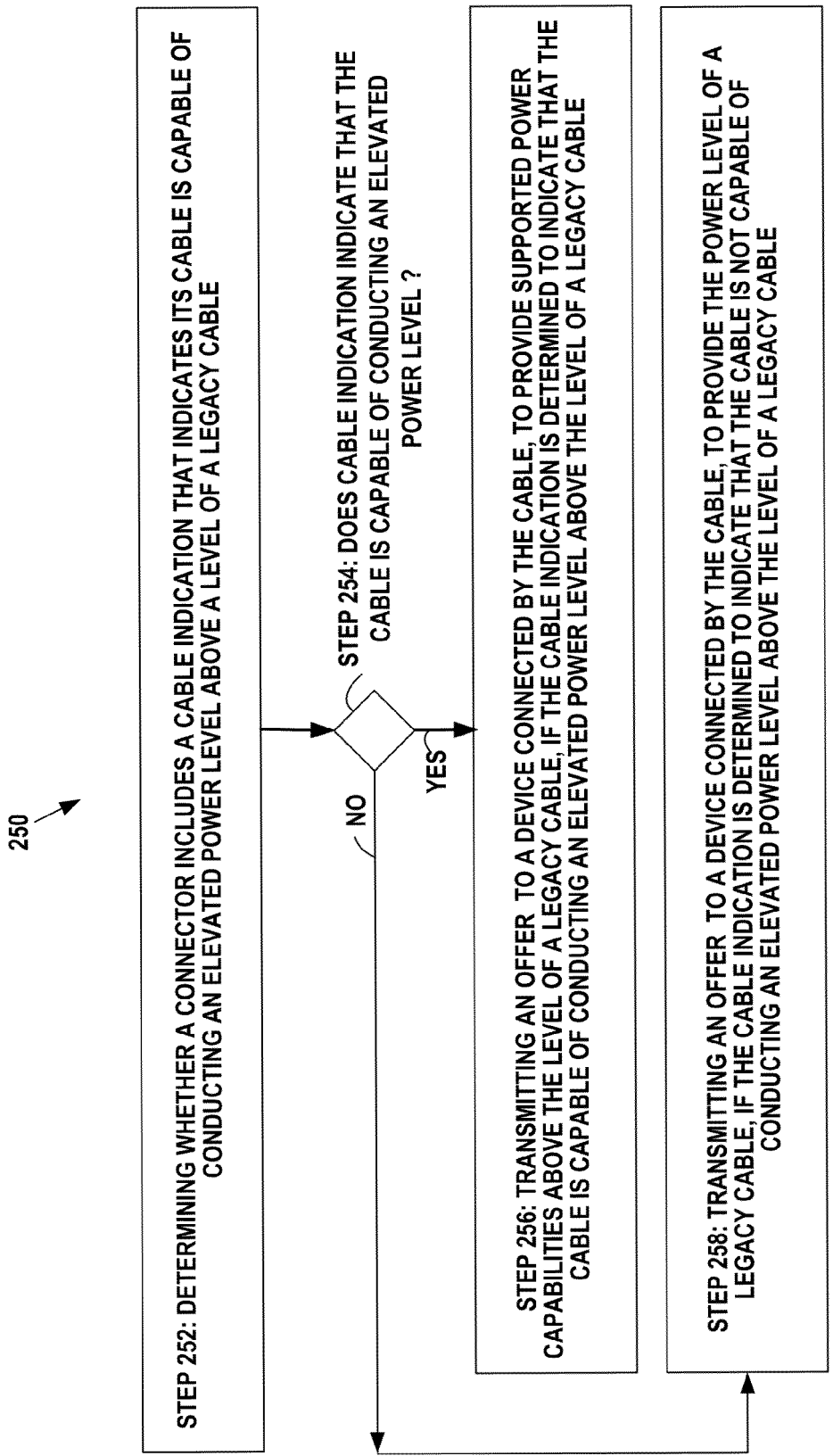

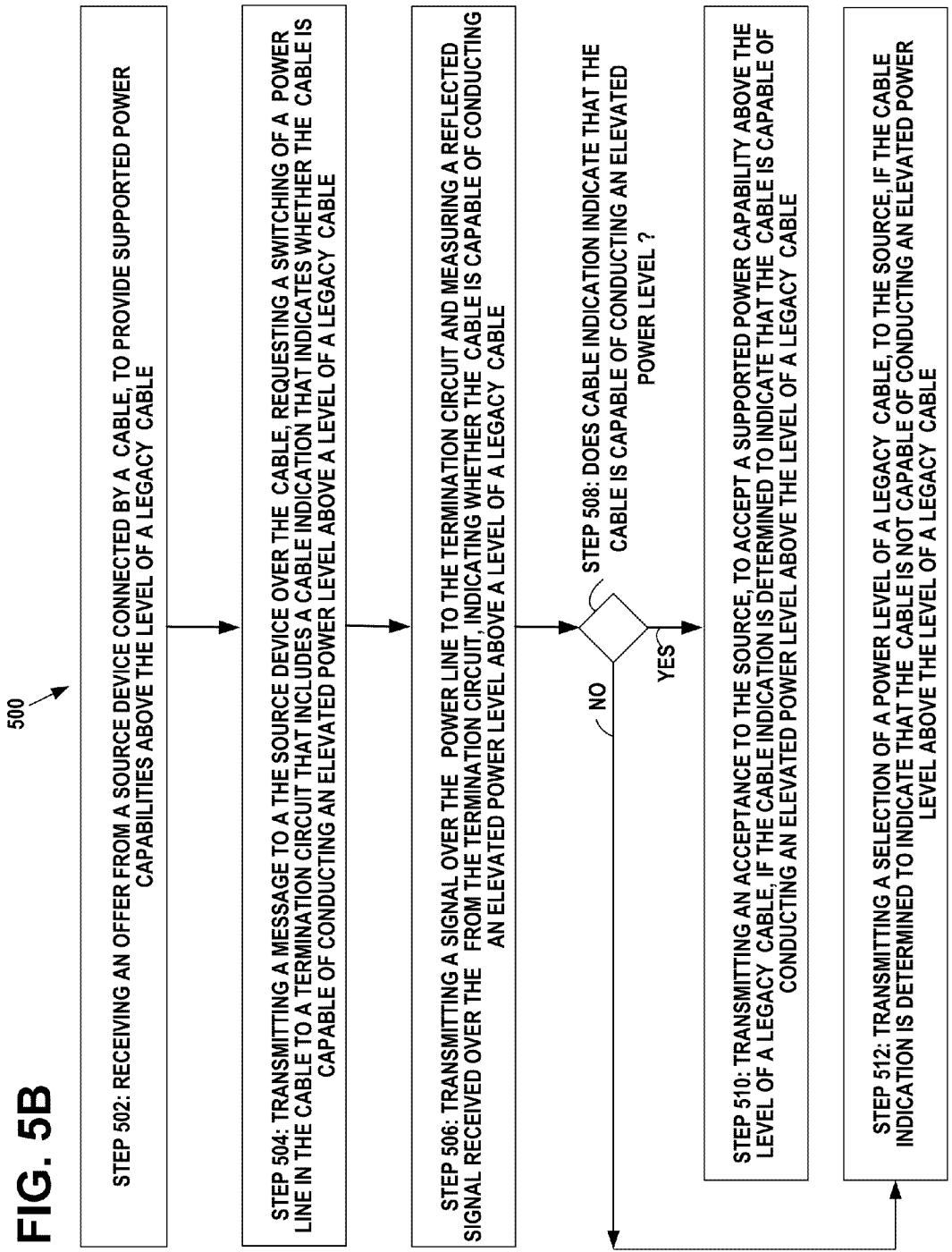

METHOD, APPARATUS, AND COMPUTER PROGRAM PRODUCT FOR CABLE DETECTION AND POWER NEGOTIATION

FIELD

The embodiments relate to interconnecting electrical apparatus, and more particularly to negotiation protocols for power delivery from a first device to a connected second device.

BACKGROUND

Serial and parallel communication interfaces are widely used to establish communication between devices such as a personal computer and mobile terminals. Unlike older connection standards such as RS-232 or Parallel port, universal serial bus (USB) ports and cables also supply electric power, enabling connected power sink devices needing operating power, to obtain their operating power via the USB cable from a host device.

SUMMARY

Method, apparatus, and computer program product embodiments of the invention are disclosed to enable negotiation for power delivery from a first device to a connected second device.

In example embodiments of the invention, a first device is to be connected to a second device by a cable via a connector that includes a cable indicator that indicates whether the cable is capable of conducting an elevated power level above the level of a legacy cable.

In example embodiments of the invention, a method comprises:

determining whether a connector includes a cable indication that indicates its cable is capable of conducting an elevated power level above a level of a legacy cable;

transmitting an offer to a device connected by the cable, to provide one or more supported power capabilities above the level of a legacy cable, if the cable indication is determined to indicate that the cable is capable of conducting an elevated power level above the level of a legacy cable; and transmitting an offer to the connected device, to provide the power level of a legacy cable, if the cable indication is determined to indicate that the cable is not capable of conducting an elevated power level above the level of a legacy cable.

In example embodiments of the invention, a first device is to be connected to the connected device by the cable via a connector that includes a mark as the cable indication that indicates whether the cable is capable of conducting an elevated power level above the level of a legacy cable.

In example embodiments of the invention, the cable is a universal serial bus cable, the connector is a universal serial bus connector and the mark is formed by a hole in a shielding portion of the connector, which is filled with an insulating material whose presence indicates whether the universal serial bus cable is capable of conducting an elevated power level above the level of a legacy universal serial bus cable.

In example embodiments of the invention, a first device is to be connected to the connected device by the cable via a connector that includes an electronic marker as the cable indication that indicates whether the cable is capable of conducting an elevated power level above the level of a legacy cable.

In example embodiments of the invention, the cable is a universal serial bus cable, the connector is a universal serial bus connector and the electronic marker is a circuit in the connector, which is connected to indicate whether the universal serial bus cable is capable of conducting an elevated power level above the level of a legacy universal serial bus cable.

In example embodiments of the invention, the method further comprises:

receiving an acceptance from the connected device, to accept a supported power capability above the level of a legacy cable, if the cable indication is determined to indicate that the cable is capable of conducting an elevated power level above the level of a legacy cable; and receiving an acceptance from the connected device, of a power level of a legacy cable, if the cable indication is determined to indicate that the cable is not capable of conducting an elevated power level above the level of a legacy cable.

In example embodiments of the invention, a method comprises:

receiving an offer from a first device connected by a cable, to provide one or more supported power capabilities above the level of a legacy cable;

determining whether a connector of the cable, includes a cable indication that indicates the cable is capable of conducting an elevated power level above a level of a legacy cable;

transmitting an acceptance to the first device, to accept a supported power capability above the level of a legacy cable, if the cable indication is determined to indicate that the cable is capable of conducting an elevated power level above the level of a legacy cable; and transmitting a selection of a power level of a legacy cable, to the first device, if the cable indication is determined to indicate that the cable is not capable of conducting an elevated power level above the level of a legacy cable.

In example embodiments of the invention, an apparatus comprises:

at least one processor;

at least one memory including computer program code;

the at least one memory and the computer program code configured to, with the at least one processor, cause the apparatus at least to:

determine whether a connector includes a cable indication that indicates its cable is capable of conducting an elevated power level above a level of a legacy cable;

transmit an offer to a device connected by the cable, to provide one or more supported power capabilities above the level of a legacy cable, if the cable indication is determined to indicate that the cable is capable of conducting an elevated power level above the level of a legacy cable; and transmit an offer to a device connected by the cable, to provide the power level of a legacy cable, if the cable indication is determined to indicate that the cable is not capable of conducting an elevated power level above the level of a legacy cable.

In example embodiments of the invention, an apparatus comprises:

at least one processor;

at least one memory including computer program code;

the at least one memory and the computer program code configured to, with the at least one processor, cause the apparatus at least to:

receive an offer from a first device connected by a cable, to provide one or more supported power capabilities above the level of a legacy cable;

determine whether a connector of the cable, includes a cable indication that indicates the cable is capable of conducting an elevated power level above a level of a legacy cable;

transmit an acceptance to the first device, to accept a supported power capability above the level of a legacy cable, if the cable indication is determined to indicate that the cable is capable of conducting an elevated power level above the level of a legacy cable; and transmit a selection of a power level of a legacy cable, to the first device, if the cable indication is determined to indicate that the cable is not capable of conducting an elevated power level above the level of a legacy cable.

In example embodiments of the invention, a computer program product comprises computer executable program code recorded on a computer readable, non-transitory storage medium, the computer executable program code, when executed by a computer processor, performing the steps, comprising:

determining whether a connector includes a cable indication that indicates its cable is capable of conducting an elevated power level above a level of a legacy cable;

transmitting an offer to a device connected by the cable, to provide one or more supported power capabilities above the level of a legacy cable, if the cable indication is determined to indicate that the cable is capable of conducting an elevated power level above the level of a legacy cable; and transmitting an offer to a device connected by the cable, to provide the power level of a legacy cable, if the cable indication is determined to indicate that the cable is not capable of conducting an elevated power level above the level of a legacy cable.

In example embodiments of the invention, a computer program product comprises computer executable program code recorded on a computer readable, non-transitory storage medium, the computer executable program code, when executed by a computer processor, performing the steps, comprising:

receiving an offer from a first device connected by a cable, to provide one or more supported power capabilities above the level of a legacy cable;

determining whether a connector of the cable, includes a cable indication that indicates the cable is capable of conducting an elevated power level above a level of a legacy cable;

transmitting an acceptance to the first device, to accept a supported power capability above the level of a legacy cable, if the cable indication is determined to indicate that the cable is capable of conducting an elevated power level above the level of a legacy cable; and transmitting a selection of a power level of a legacy cable, to the first device, if the cable indication is determined to indicate that the cable is not capable of conducting an elevated power level above the level of a legacy cable.

In example embodiments of the invention, a connector at the opposite end of the cable from the first device, includes a cable termination circuit having a cable indication that indicates whether the cable is capable of conducting an elevated power level above the level of a legacy cable.

In example embodiments of the invention, a method comprises:

transmitting a request by a first device requesting a function be performed by a second device to enable detecting a cable indication that indicates whether a cable connecting the first and second devices is capable of conducting an elevated power level above a level of a legacy cable;

transmitting a signal through the cable to a termination circuit in a connector of the cable and receiving a reflected signal in response from the termination circuit, which indicates the cable indication;

transmitting an offer to the second device connected by the cable, to provide one or more supported power capabilities above the level of a legacy cable, if the cable indication is determined to indicate that the cable is capable of conducting an elevated power level above the level of a legacy cable; and transmitting an offer to the second device, to provide the power level of a legacy cable, if the cable indication is determined to indicate that the cable is not capable of conducting an elevated power level above the level of a legacy cable.

In example embodiments of the invention, the method further comprises:

receiving an acceptance of the offer to the second device, to provide a supported power capability above the level of a legacy cable, if the cable indication is determined to indicate that the cable is capable of conducting an elevated power level above the level of a legacy cable; and receiving an acceptance of the offer to the second device, to provide the power level of a legacy cable, if the cable indication is determined to indicate that the cable is not capable of conducting an elevated power level above the level of a legacy cable.

In example embodiments of the invention, the first device is to be connected to the second device by a universal serial bus cable having a universal serial bus connector at an opposite end of the cable from the first device, the universal serial bus connector including a cable termination circuit having the cable indication that indicates whether the universal serial bus cable is capable of conducting an elevated power level above the level of a legacy universal serial bus cable.

In example embodiments of the invention, a method comprises:

receiving at a second device a request from a first device requesting a function be performed to enable the first device to detect a cable indication of a cable connecting the first and second devices, the cable indication indicating whether the cable is capable of conducting an elevated power level above the level of a legacy cable;

performing the function to enable the first device to detect the cable indication;

receiving an offer from the first device connected by the cable, to provide one or more supported power capabilities above the level of a legacy cable, if the cable indication is determined to indicate that the cable is capable of conducting an elevated power level above the level of a legacy cable; and receiving an offer from the first device, to provide the power level of a legacy cable, if the cable indication is determined to indicate that the cable is not capable of conducting an elevated power level above the level of a legacy cable.

In example embodiments of the invention, the method further comprises:

determining whether a connector of the cable, includes a cable indication that indicates the cable is capable of conducting an elevated power level above a level of a legacy cable;

transmitting an acceptance to the first device, to accept a supported power capability above the level of a legacy cable, if the cable indication is determined to indicate that the cable is capable of conducting an elevated power level above the level of a legacy cable; and transmitting a selection of a power level of a legacy cable, to the first device, if the cable indication is determined to indicate that the cable is not capable of conducting an elevated power level above the level of a legacy cable.

In example embodiments of the invention, the first device is to be connected to the second device by a universal serial bus cable having a universal serial bus connector at an opposite end of the cable from the second device, the universal serial bus connector including a cable termination circuit having the cable indication that indicates whether the universal serial bus cable is capable of conducting an elevated power level above the level of a legacy universal serial bus cable.

In example embodiments of the invention, an apparatus comprises:

at least one processor;

at least one memory including computer program code;

the at least one memory and the computer program code configured to, with the at least one processor, cause the apparatus at least to:

transmit a request by the apparatus requesting a function be performed by a second device to enable detecting a cable indication that indicates whether a cable connecting the apparatus and second devices is capable of conducting an elevated power level above a level of a legacy cable;

transmit a signal through the cable to a termination circuit in a connector of the cable and receiving a reflected signal in response from the termination circuit, which indicates the cable indication;

transmit an offer to the second device connected by the cable, to provide one or more supported power capabilities above the level of a legacy cable, if the cable indication is determined to indicate that the cable is capable of conducting an elevated power level above the level of a legacy cable; and transmit an offer to the second device, to provide the power level of a legacy cable, if the cable indication is determined to indicate that the cable is not capable of conducting an elevated power level above the level of a legacy cable.

In example embodiments of the invention, the apparatus further comprises:

the at least one memory and the computer program code configured to, with the at least one processor, cause the apparatus at least to:

receive an acceptance of the offer to the second device, to provide a supported power capability above the level of a legacy cable, if the cable indication is determined to indicate that the cable is capable of conducting an elevated power level above the level of a legacy cable; and receive an acceptance of the offer to the second device, to provide the power level of a legacy cable, if the cable indication is determined to indicate that the cable is not capable of conducting an elevated power level above the level of a legacy cable.

In example embodiments of the invention, an apparatus comprises:

at least one processor;

at least one memory including computer program code;

the at least one memory and the computer program code configured to, with the at least one processor, cause the apparatus at least to:

receive at the apparatus a request from a first device requesting a function be performed to enable the first device to detect a cable indication of a cable connecting the first device and the apparatus, the cable indication indicating whether the cable is capable of conducting an elevated power level above the level of a legacy cable;

perform the function to enable the first device to detect the cable indication;

receive an offer from the first device connected by the cable, to provide one or more supported power capabilities above the level of a legacy cable, if the cable indication is determined to indicate that the cable is capable of conducting an elevated power level above the level of a legacy cable; and receive an offer from the first device, to provide the power level of a legacy cable, if the cable indication is determined to indicate that the cable is not capable of conducting an elevated power level above the level of a legacy cable.

In example embodiments of the invention, the apparatus further comprises:

the at least one memory and the computer program code configured to, with the at least one processor, cause the apparatus at least to:

determine whether a connector of the cable, includes a cable indication that indicates the cable is capable of conducting an elevated power level above a level of a legacy cable;

transmit an acceptance to the first device, to accept a supported power capability above the level of a legacy cable, if the cable indication is determined to indicate that the cable is capable of conducting an elevated power level above the level of a legacy cable; and transmit a selection of a power level of a legacy cable, to the first device, if the cable indication is determined to indicate that the cable is not capable of conducting an elevated power level above the level of a legacy cable.

In example embodiments of the invention, a computer program product comprises computer executable program code recorded on a computer readable, non-transitory storage medium, the computer executable program code, when executed by a computer processor, performing the steps, comprising:

transmitting a request by a first device requesting a function be performed by a second device to enable detecting a cable indication that indicates whether a cable connecting the first and second devices is capable of conducting an elevated power level above a level of a legacy cable;

transmitting a signal through the cable to a termination circuit in a connector of the cable and receiving a reflected signal in response from the termination circuit, which indicates the cable indication;

transmitting an offer to the second device connected by the cable, to provide one or more supported power capabilities above the level of a legacy cable, if the cable indication is determined to indicate that the cable is capable of conducting an elevated power level above the level of a legacy cable; and transmitting an offer to the second device, to provide the power level of a legacy cable, if the cable indication is determined to indicate that the cable is not capable of conducting an elevated power level above the level of a legacy cable.

In example embodiments of the invention, a computer program product comprises computer executable program code recorded on a computer readable, non-transitory storage medium, the computer executable program code, when executed by a computer processor, performing the steps, comprising:

receiving at a second device a request from a first device requesting a function be performed to enable the first device to detect a cable indication of a cable connecting the first and second devices, the cable indication indicating whether the cable is capable of conducting an elevated power level above the level of a legacy cable;

performing the function to enable the first device to detect the cable indication;

receiving an offer from the first device connected by the cable, to provide one or more supported power capabilities above the level of a legacy cable, if the cable indication is determined to indicate that the cable is capable of conducting an elevated power level above the level of a legacy cable; and receiving an offer from the first device, to provide the power level of a legacy cable, if the cable indication is determined to indicate that the cable is not capable of conducting an elevated power level above the level of a legacy cable.

In this manner, embodiments of the invention enable negotiation for power delivery from a first device to a second device.

DESCRIPTION OF THE FIGURES

FIG. 1C is an example flow diagram of operational steps of an example embodiment of the procedure performed in the host device, according to an embodiment of the present invention.

FIG. 5B is an example flow diagram of operational steps of an example embodiment of the procedure performed in the connected device of FIG. 5A, according to an embodiment of the present invention.

DISCUSSION OF EXAMPLE EMBODIMENTS

Figure 1A:
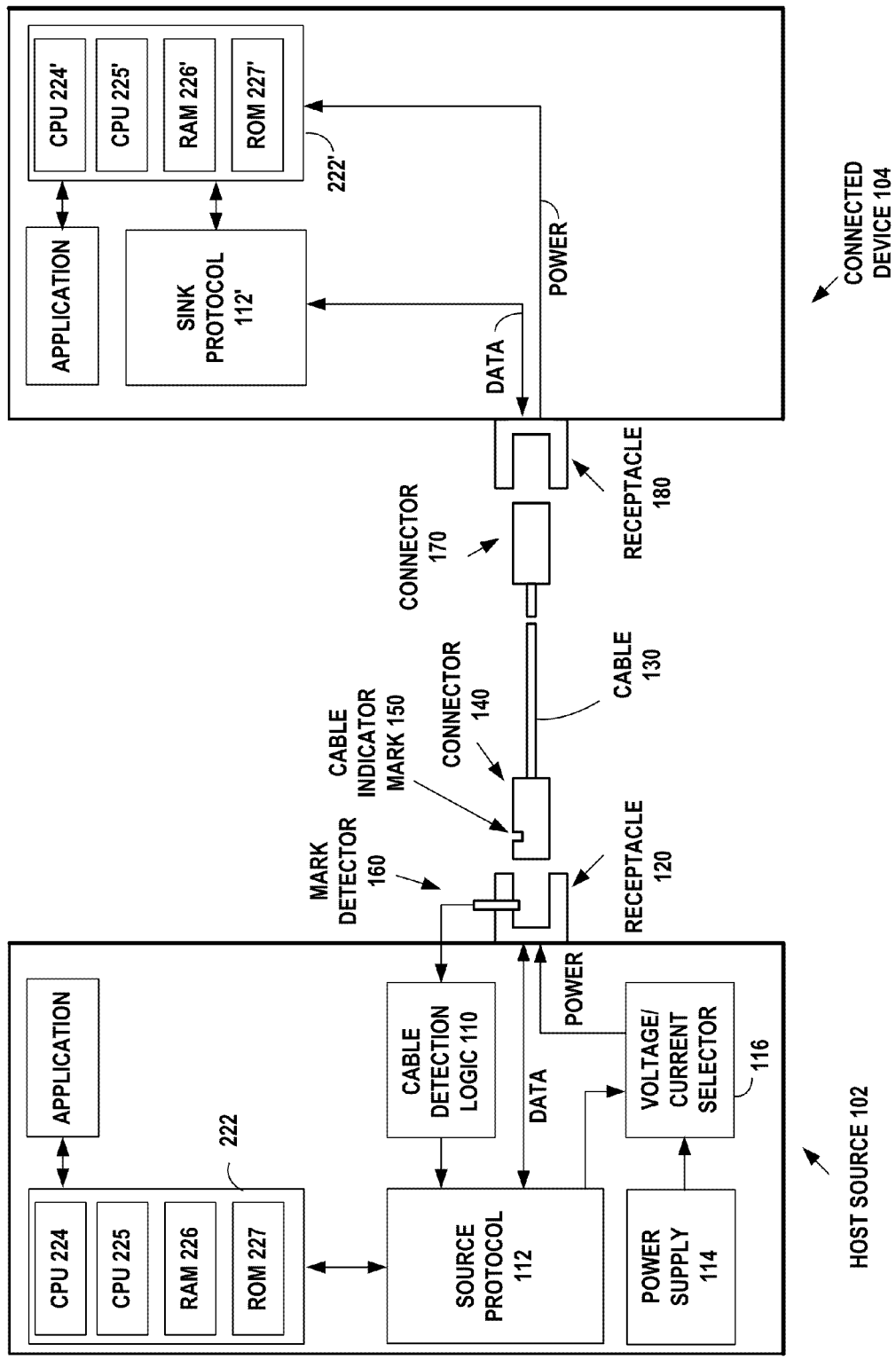
FIG. 1A illustrates an example functional block diagram of a host device and a connected device to be connected by a cable. The connector includes a cable indicator mark in accordance with an example embodiment of the invention.

A USB system may include a host, a plurality of downstream USB ports, and a plurality of peripheral devices connected in a tiered-star topology. Additional USB hubs may be included in the tiers, allowing branching into a tree structure with up to five tier levels. A USB host may have multiple host controllers and each host controller may provide one or more USB ports. Up to 127 devices, including hub devices, may be connected to a single host controller.

When a USB device is first connected to a USB host, a USB device enumeration process is started. The enumeration starts by sending a reset signal to the USB device. The data rate of the USB device is determined during the reset signaling. After reset, the USB device's information is read by the host and the device is assigned a unique 7-bit address. If the device is supported by the host, the device drivers needed for communicating with the device are loaded from the host's memory or a server and the device is set to a configured state. If the USB host is restarted, the enumeration process is repeated for all connected devices. In general, USB cables have only connectors, and hosts and devices have only receptacles. Most hosts have type-A receptacles, and most connected devices have type-B receptacles. Type-A connectors mate only with type-A receptacles and type-B connectors mate only with type-B receptacles.

The USB standard type-A connector is a flattened rectangle that inserts into a USB type-A receptacle on a USB host, or a hub, and carries both power and data.

The USB standard type-B connector has a square shape with beveled exterior corners and connects into a type-B receptacle on a device that uses a removable cable, such as a printer. A type-B connector delivers power on the Vbus pin, in addition to carrying data. USB Mini B connector may be used for smaller devices such as PDAs, mobile phones or digital cameras. The Mini-B connectors are approximately 3 by 7 mm in cross section. Micro-B type connectors have a similar width but approximately half the thickness, enabling their integration into thinner portable devices.

USB specification defines a 5 volt supply on a single power conductor (Vbus) from which connected USB devices may draw power. A unit load is defined as 100 mA in USB 2.0, and 150 mA in USB 3.0. A maximum of 500 mA may be drawn from a port in USB 2.0 and 900 mA in USB 3.0.

According to an exemplary embodiment the host and device role may be changed based on a communication protocol or based on a reestablished cable connection between the host and the device. For this a dedicated connector may identify the host role and another dedicated connector may identify the device role. The host power delivery role is not changed in this setup. Further in another example the host source for power delivery and the connected device as sink might also change. This may be independently of the role change. In a further example the host and device role and the host source and connected device for power delivery may change at the same time. For the change procedure a similar approach as described for the host and device role change may be used.

There is interest in the field to raise the power delivery of host sources to upwards of 60 Watts over a cable that has a power conductor and one or more data conductors, such as for example a USB cable, to expand the types of connected devices to include those consuming larger amounts of power. The host device and connected device may negotiate the level of power that may be delivered to the connected device. As part of this negotiation, the host source and connected device may consider whether there is sufficient power handling capacity for the cable connecting them and, also, whether there may be non-standard cabling, such as Y-branched cables, in use.

FIG. 1A illustrates an example functional block diagram of a host device 102 and a connected device 104 to be connected by a cable 130, such as for example a USB cable. The connector 140, such as a USB type-A connector includes a cable indicator mark 150 that indicates the cable 130 is capable of conducting an elevated power level above the level of a legacy cable. The host device 102 has a receptacle 120, such as for example a USB type-A receptacle that includes a mark detector 160 that detects the presence or absence of the cable indicator mark 150 when the connector 140 is plugged onto the receptacle 120. Cable detection logic 110 connected to the mark detector 160 determines whether the mark 150 is present and provides that indication to the source protocol 112. If the mark 150 indicates that the cable is capable of conducting an elevated power level above the level of a legacy cable, then the source protocol 112 may offer to the connected device 104, one or more supported power capabilities above the level of a legacy cable, in accordance with an example embodiment of the invention. The one or more supported power capabilities may be for example one of high voltage capability, high current capability and extra high current capability. Alternately, if the mark 150 indicates that the cable is not capable of conducting an elevated power level above the level of a legacy cable, then the source protocol 112 limits to only the level of a legacy cable, in accordance with an example embodiment of the invention.

In accordance with an example embodiment of the invention, the host device 102 may include processing logic 222 that may include one of several central processor units (CPUs) 224 and 225, a random-access memory (RAM) 226, and a read-only memory (ROM) 227. Alternately, processing logic 222 may include programmed logic arrays of sequential and combinatorial logic circuits and state machine logic implementing some or all of the steps performed by embodiments of the invention. The source protocol 112 may be embodied as a programmed sequence of executable instructions stored in the RAM or ROM and executed by the central processor unit (CPU) to carry out the functions of embodiments of the invention. The output of the cable selection logic 110 is applied to the source protocol 112, which outputs a selection signal to the voltage/current selector 116, to deliver a selected voltage and current from the power supply 114 to the receptacle 120 and the connector 140 to the power conductor of the cable 130. In an example embodiment the power conductor may be the Vbus of an USB cable.

In accordance with an example embodiment of the invention, the connected device 104 may include processing logic 222' that may include one of several CPUs 224' and 225', a RAM memory 226', and a ROM memory 227'. Alternately, processing logic 222' may include programmed logic arrays of sequential and combinatorial logic circuits and state machine logic implementing some or all of the steps performed by embodiments of the invention. The sink protocol 112' may be embodied as a programmed sequence of executable instructions stored in the RAM or ROM and executed by the CPU to carry out the functions of embodiments of the invention. The selected voltage and current from Vbus of the cable 130 is delivered by the connector 170 and the receptacle 180 to the processing logic 222' and other circuits in the connected device 104.

In accordance with an example embodiment the connector and related receptacle may be one of the following types USB standard type-A, USB standard type-B, Mini-A, Mini-B, Micro-A and Micro-B. In accordance with another example embodiment a receptacle could be a combined one for Mini-A and Mini-B connectors for example a Mini-AB receptacle. In accordance with another example embodiment a receptacle could be a combined one for Micro-A and Micro-B connectors for example a Micro-AB receptacle.

The host source device 102 of FIG. 1A includes at least one processor 224 and 225, at least one memory 226 and 227 including computer program code, the at least one memory and the computer program code configured to, with the at least one processor, cause the connected device at least to:

determine whether a connector 140 includes an indicator mark cable indication 150 that indicates its cable 130 is capable of conducting an elevated power level above a level of a legacy cable;

transmit an offer to a device 104 connected by the cable 130, to provide one or more supported power capabilities above the level of a legacy cable, if the indicator mark cable indication 150 is determined to indicate that the cable is capable of conducting an elevated power level above the level of a legacy cable; and transmit an offer to a device 104 connected by the cable 130, to provide the power level of a legacy cable, if the indicator mark cable indication 150 is determined to indicate that the cable is not capable of conducting an elevated power level above the level of a legacy cable.

Figure 1B:
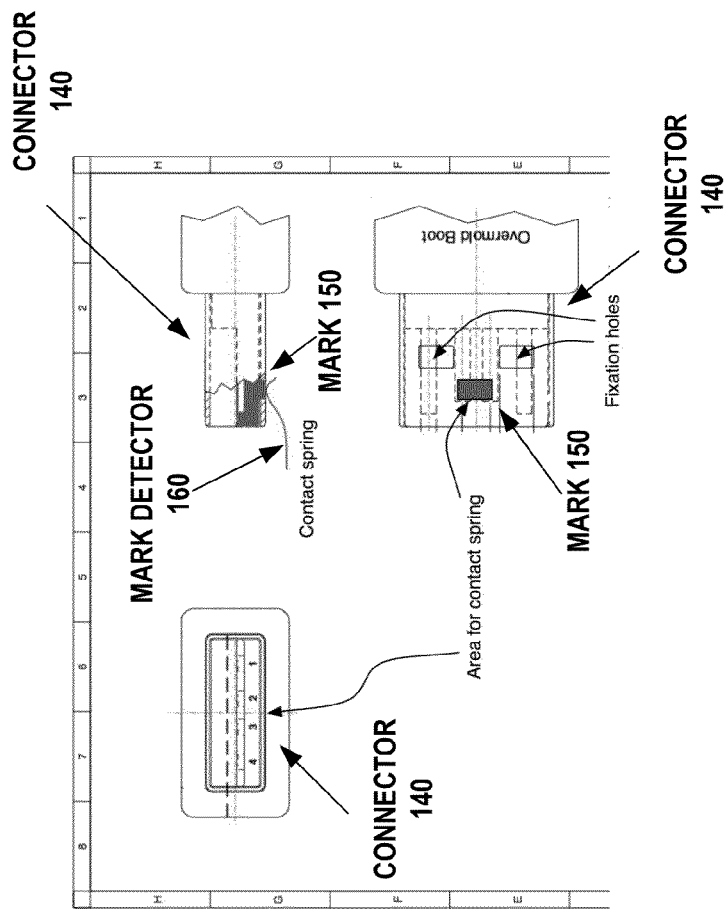
FIG. 1B illustrates an example orthogonal projection drawing of the connector, showing the cable indicator mark that indicates the cable is capable of conducting an elevated power level above the level of a legacy cable.

FIG. 1B illustrates an example orthogonal projection drawing of the connector 140, showing the cable indicator mark 150 that indicates the cable 130 is capable of conducting an elevated power level above the level of a legacy cable. The mark detector 160 of the receptacle 120 is shown, which detects the presence or absence of the cable indicator mark 150 when the connector 140 is plugged onto the receptacle 120. The mark 150 is a small square-cut hole in the metal ground shield of the normal connector 140 with a plastic filler molded into that hole. The mark detector 160 is a spring contact mounted in the receptacle 120. The spring contact senses whether the connector 140 is a normal connector, where there would be metal in the location of the hole connected to ground potential or, alternately, not a normal connector, because there is no connection to ground potential in the special cable, i.e., because the plastic filler in the hole 150 insulates the spring contact from ground potential. This enables cables that are capable of handling higher power, to be marked as such. It also provides an additional way to detect when a cable is attached or detached.

In accordance with an example embodiment of the invention, a cable detection process with electronically marked cables with the cable indicator mark 150, may be as follows. When using an electronically marked cable, the following method may be used:

In power source (host source 102):
1. Detection of cable attachment to receptacle 120.
2. Check for electronic marking 150 in the source connector 140 (assumed to take a negligible length of time)
3. Offer power capabilities based on detected cable
4. Wait for response from connected device 104 indicating the selected capabilities In power sink (connected device 104)
1. Receive capabilities from the host source 102
2. If legacy only capabilities offered (for example 1.5 A @ 5V or less) then just select
3. Else, if greater than legacy power offered, then check for electronic marking 150' in the connector 170' (shown in FIGS. 2A and 2B).
4. If no electronic marking in the type-B connector 170', then just select legacy
5. Else, if electronic marking 150', then select greater than legacy power.

FIG. 1C is an example flow diagram 250 of operational steps of an example embodiment of the procedure performed in the host device 102, according to an embodiment of the present invention. An example of steps in the procedure carried out by the host device 102 in executing-in-place program code stored in the memory of the host device. The steps in the procedure of the flow diagram may be embodied as program logic stored in the memory of the device in the form of sequences of programmed instructions which, when executed in the processing logic of the device, carry out the functions of an exemplary disclosed embodiment. Alternately, some or all of the steps in the procedure of the flow diagram may be embodied as hardware program logic included in programmed logic arrays of sequential and/or combinatorial logic circuits and/or state machine logic implementing some or all of the steps performed by embodiments of the invention. The steps may be carried out in another order than shown and individual steps may be combined or separated into component steps. Additional steps may be inserted into this sequence. The steps in the procedure are as follows:

Step 252: determining whether a connector includes a cable indication that indicates its cable is capable of conducting an elevated power level above a level of a legacy cable Step 254: does cable indication indicate that the cable is capable of conducting an elevated power level?

Step 256: transmitting an offer to a device connected by the cable, to provide one or more supported power capabilities above the level of a legacy cable, if the cable indication is determined to indicate that the cable is capable of conducting an elevated power level above the level of a legacy cable.

Step 258: transmitting an offer to a device connected by the cable, to provide the power level of a legacy cable, if the cable indication is determined to indicate that the cable is not capable of conducting an elevated power level above the level of a legacy cable.

Figure 3A:
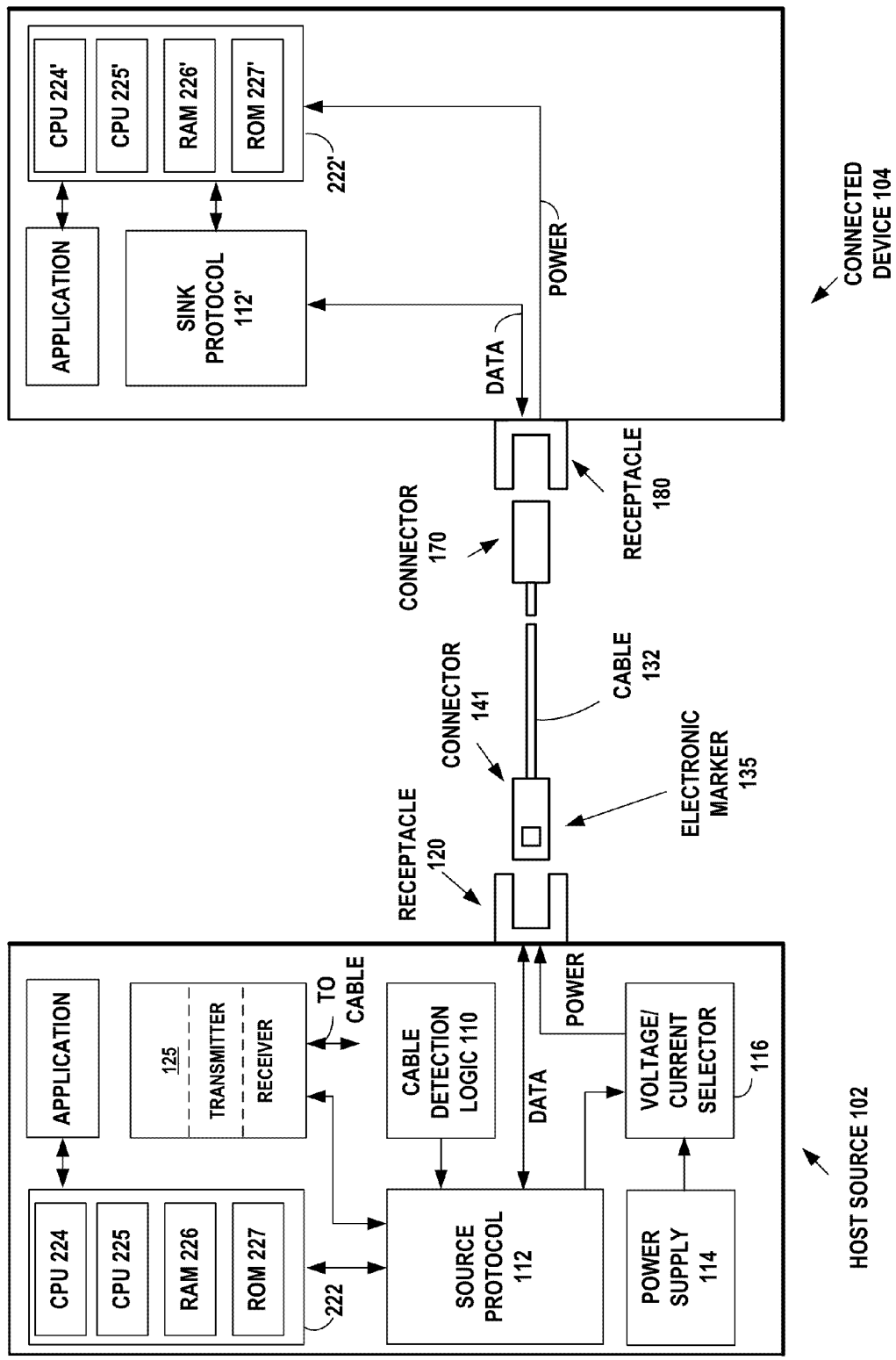
FIG. 3A illustrates an example functional block diagram of a host device and a connected device to be connected by the cable. The connector includes an electronic marker as a cable indicator, in accordance with an example embodiment of the invention.

The operation of the example embodiment shown in FIG. 3A, where the connector 141 includes an electronic marker 135 as a cable indicator, is shown in FIG. 1C flow diagram 250, according to an embodiment of the present invention.

Figure 1D:
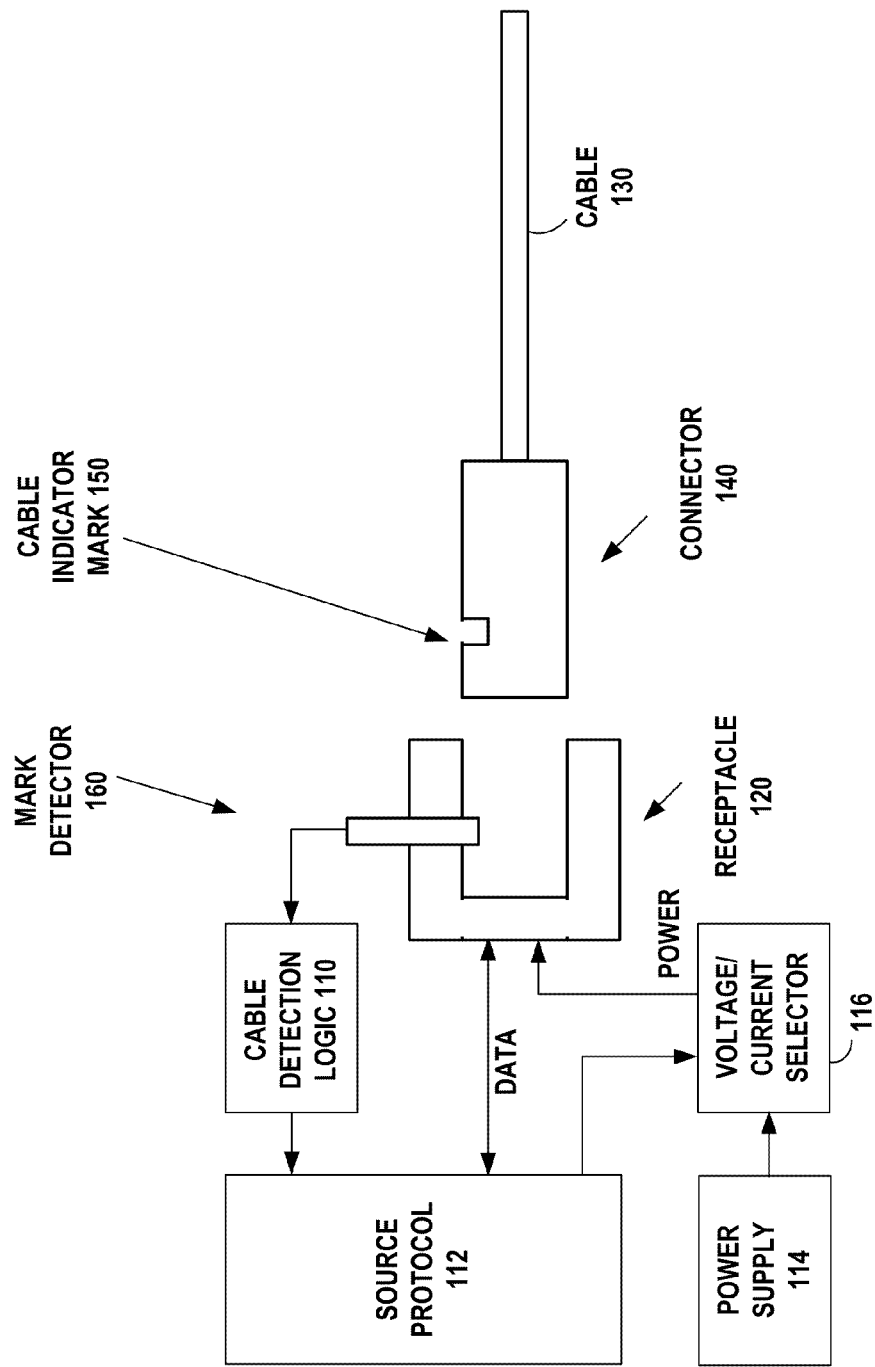
FIG. 1D illustrates the connector, showing the cable indicator mark to provide an indication of cable power capacity of the cable in accordance with an example embodiment of the invention.

FIG. 1D illustrates the connector 140, showing the cable indicator mark 150 to provide an indication of cable power capacity of the cable 130, in accordance with an example embodiment of the invention. The corresponding mark detector 160 of the receptacle 120 detects the presence or absence of the cable indicator mark 150 when the connector 140 is plugged onto the receptacle 120, in accordance with an example embodiment of the invention.

Figure 1E:
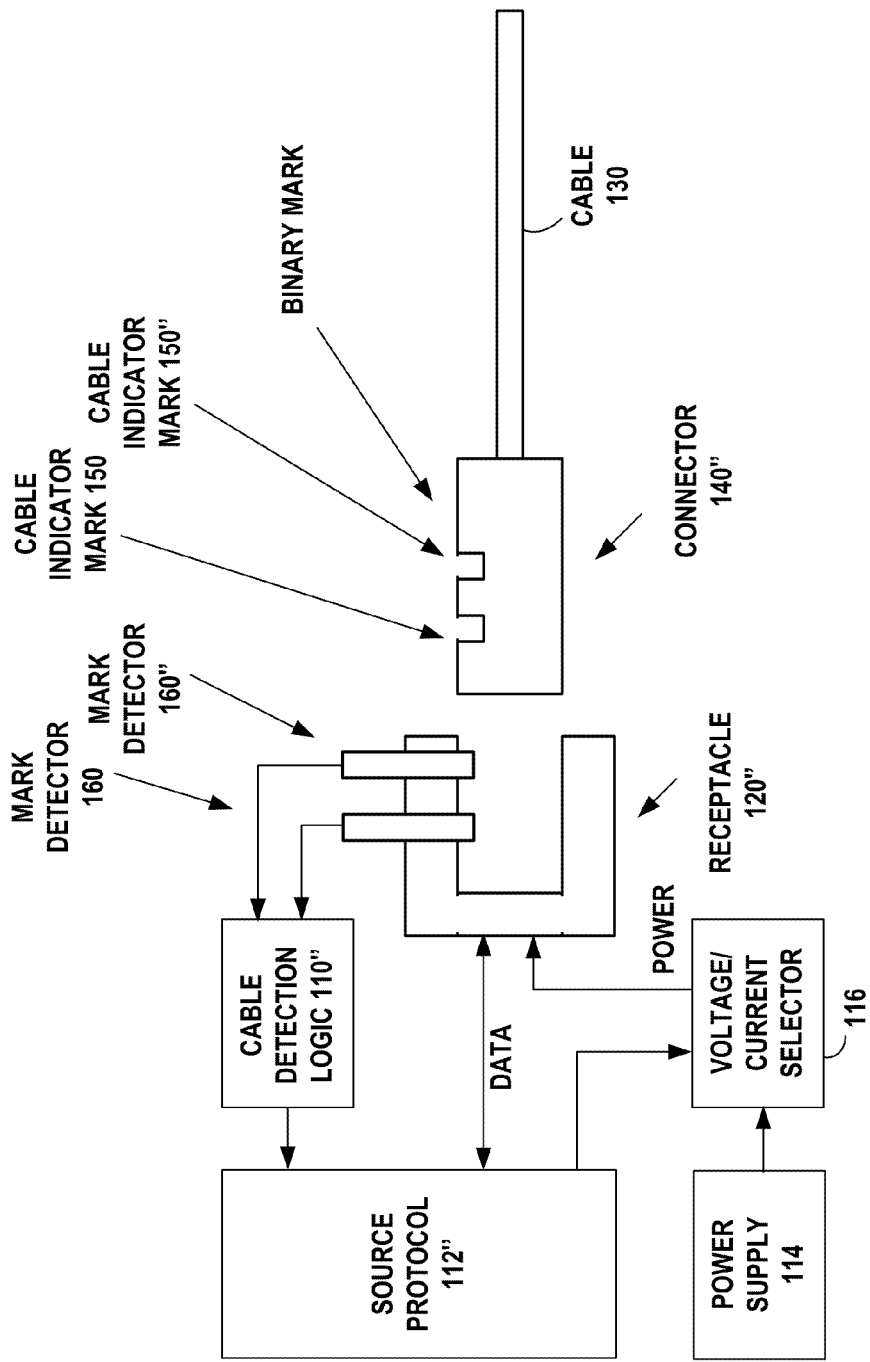
FIG. 1E illustrates an example alternate embodiment of the connector, showing two or more cable indicator marks to provide a binary indication of one of several possible cable power capacities of the cable.

FIG. 1E illustrates an example alternate embodiment of the connector 140, showing two or more cable indicator marks 150 and 150" to provide a binary indication of one of several possible cable power capacities of the cable 130. The there are two or more corresponding mark detectors 160 and 160" of the receptacle 120, which detect the presence or absence of the cable indicator marks 150 and 150" when the connector 140" is plugged onto the receptacle 120", in accordance with an example embodiment of the invention.

Figure 2A:
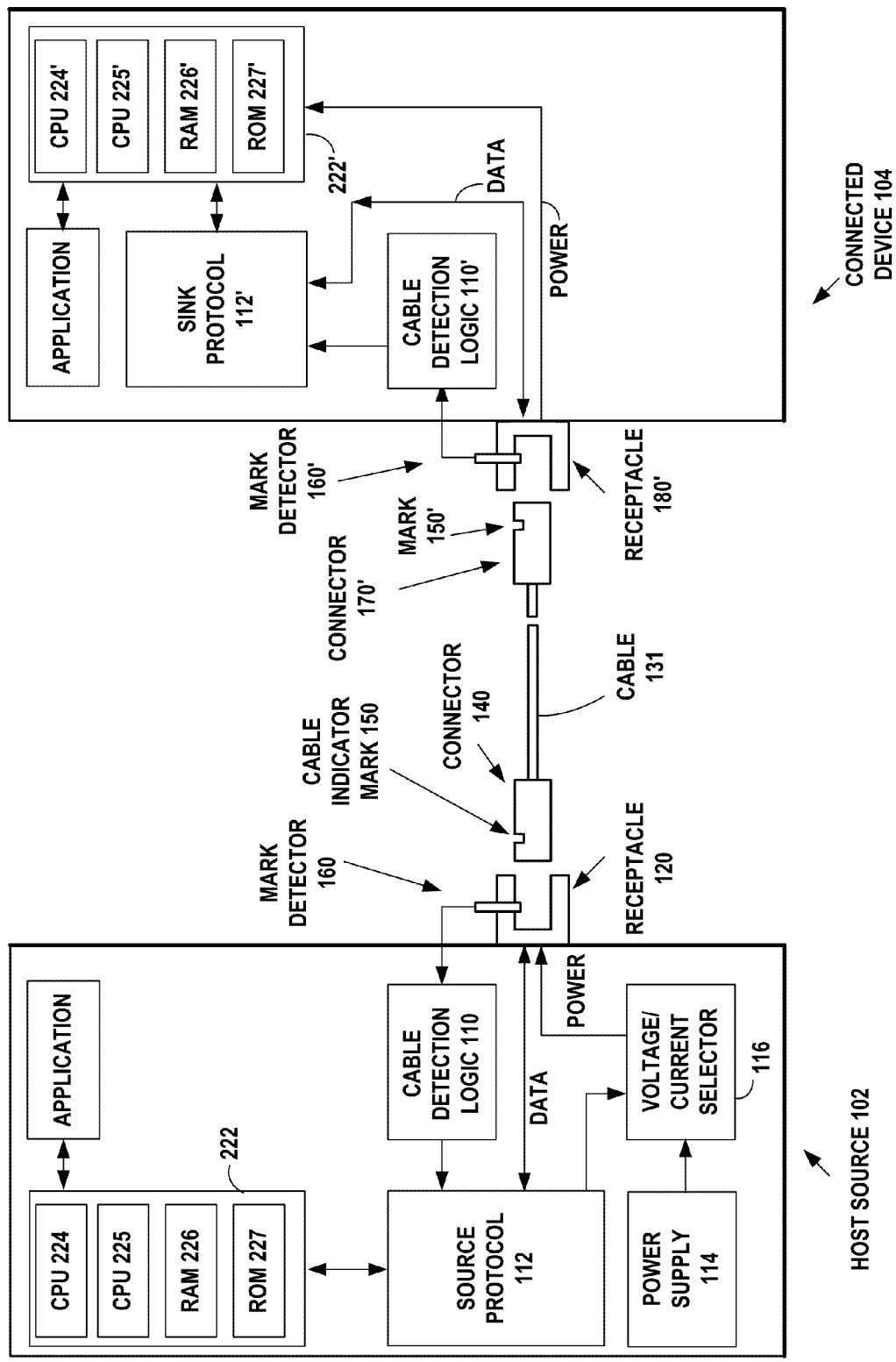
FIG. 2A illustrates an example functional block diagram of the host device and a connected device based on FIG. 1A, wherein the connector includes a cable indicator mark, in accordance with an example embodiment of the invention.

FIG. 2A illustrates an example functional block diagram of the host device 102 and a connected device 104 based on FIG. 1A, wherein the connector 170', such as for example a USB type-B connector includes a cable indicator mark 150' that indicates the cable 131, such as for example a USB cable is capable of conducting an elevated power level above the level of a legacy cable. The connected device 104 has a receptacle 180', such as for example a USB type-B receptacle that includes a mark detector 160' that detects the presence or absence of the cable indicator mark 150' when the connector 170' is plugged onto the receptacle 180'. Cable detection logic 110' connected to the mark detector 160' determines whether the mark 150' is present and provides that indication to the sink protocol 112'. If the mark 150' indicates that the cable 131 is capable of conducting an elevated power level above the level of a legacy cable, then the sink protocol 112' may accept an offer from the host device 102, to accept one of the supported power capability of the host device 102 above the level of a legacy cable if both ends of the cable are supporting elevated power level above the level of a legacy cable in accordance with an example embodiment of the invention. Alternately, if the mark 150' indicates that the cable 131 is not capable of conducting an elevated power level above the level of a legacy cable, then the sink protocol 112' limits its acceptance of to only offers of the level of a legacy cable, in accordance with an example embodiment of the invention.

The connected device 104 of FIG. 2A includes at least one processor 224' and 225', at least one memory 226' and 227' including computer program code, the at least one memory and the computer program code configured to, with the at least one processor, cause the connected device at least to:

receive an offer from a source device 102 connected by a cable 131, to provide one or more supported power capabilities above the level of a legacy cable;

determine whether a connector 170' of the cable, includes a indicator mark cable indication 150' that indicates the cable is capable of conducting an elevated power level above a level of a legacy cable;

transmit an acceptance to the source device 102, to accept a supported power capability above the level of a legacy cable, if the indicator mark cable indication 150' is determined to indicate that the cable is capable of conducting an elevated power level above the level of a legacy cable; and transmit a selection of a power level of a legacy cable, to the source device 102, if the indicator mark cable indication 150' is determined to indicate that the cable is not capable of conducting an elevated power level above the level of a legacy cable.

Figure 2B:
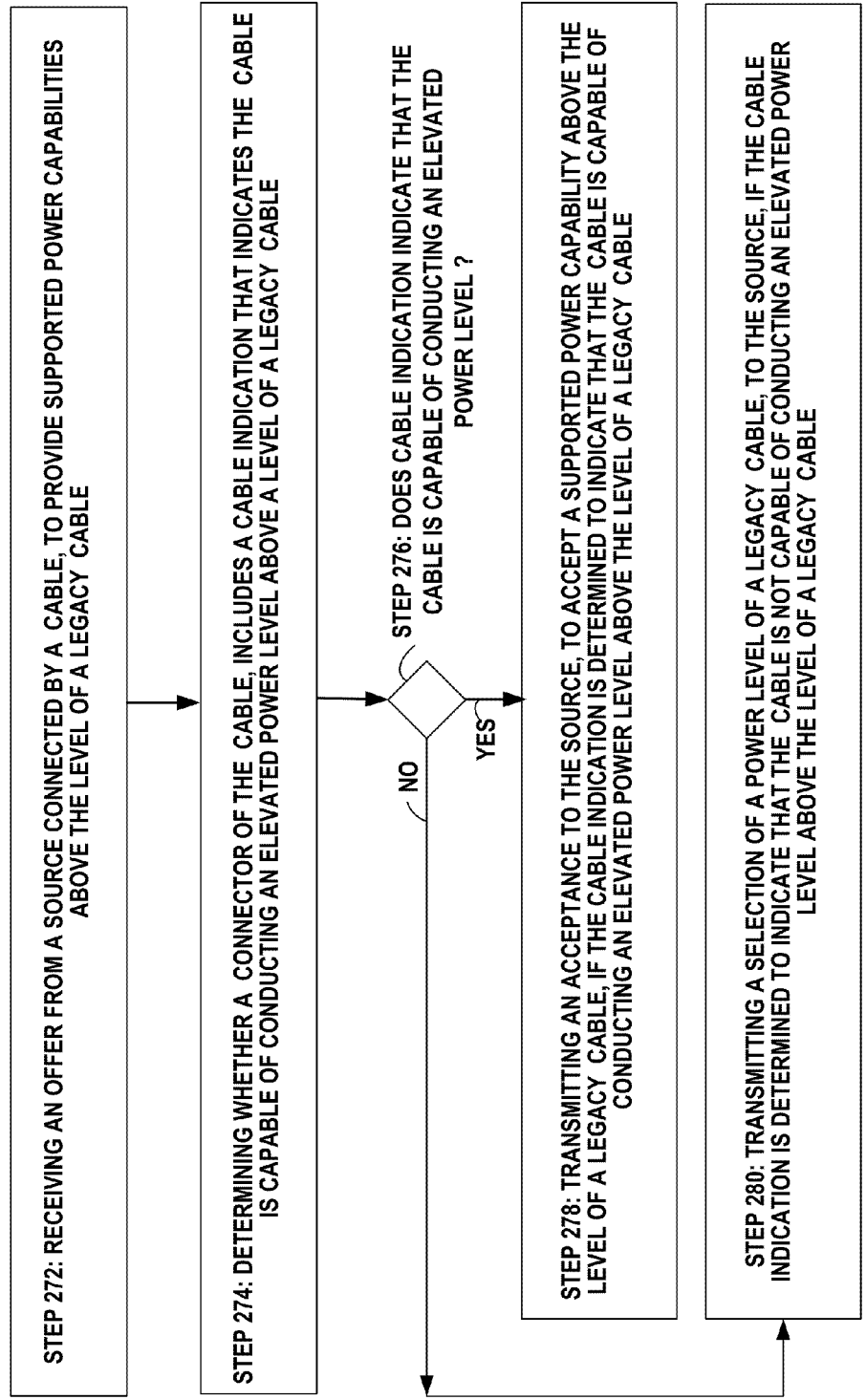
FIG. 2B is an example flow diagram of operational steps of an example embodiment of the procedure performed in the connected device, according to an embodiment of the present invention.

FIG. 2B is an example flow diagram 270 of operational steps of an example embodiment of the procedure performed in the connected device 104, according to an embodiment of the present invention. An example of steps in the procedure carried out by the connected device 104 in executing-in-place program code stored in the memory of the device. The steps in the procedure of the flow diagram may be embodied as program logic stored in the memory of the device in the form of sequences of programmed instructions which, when executed in the processing logic of the device, carry out the functions of an exemplary disclosed embodiment. Alternately, some or all of the steps in the procedure of the flow diagram may be embodied as hardware program logic included in programmed logic arrays of sequential and/or combinatorial logic circuits and/or state machine logic implementing some or all of the steps performed by embodiments of the invention. The steps may be carried out in another order than shown and individual steps may be combined or separated into component steps. Additional steps may be inserted into this sequence. The steps in the procedure are as follows:

Step 272: receiving an offer from a host device connected by a cable, to provide one or more supported power capabilities above the level of a legacy cable Step 274: determining whether a connector of the cable, includes at least one cable indication that indicates the cable is capable of conducting an elevated power level above a level of a legacy cable Step 276: does cable indication indicate that the cable is capable of conducting an elevated power level?

Step 278: transmitting an acceptance to the host device, to accept a supported power capability above the level of a legacy cable, if the cable indication is determined to indicate that the cable is capable of conducting an elevated power level above the level of a legacy cable.

Step 280: transmitting a selection of a power level of a legacy cable, to the host device, if the cable indication is determined to indicate that the cable is not capable of conducting an elevated power level above the level of a legacy cable.

Figure 3B:
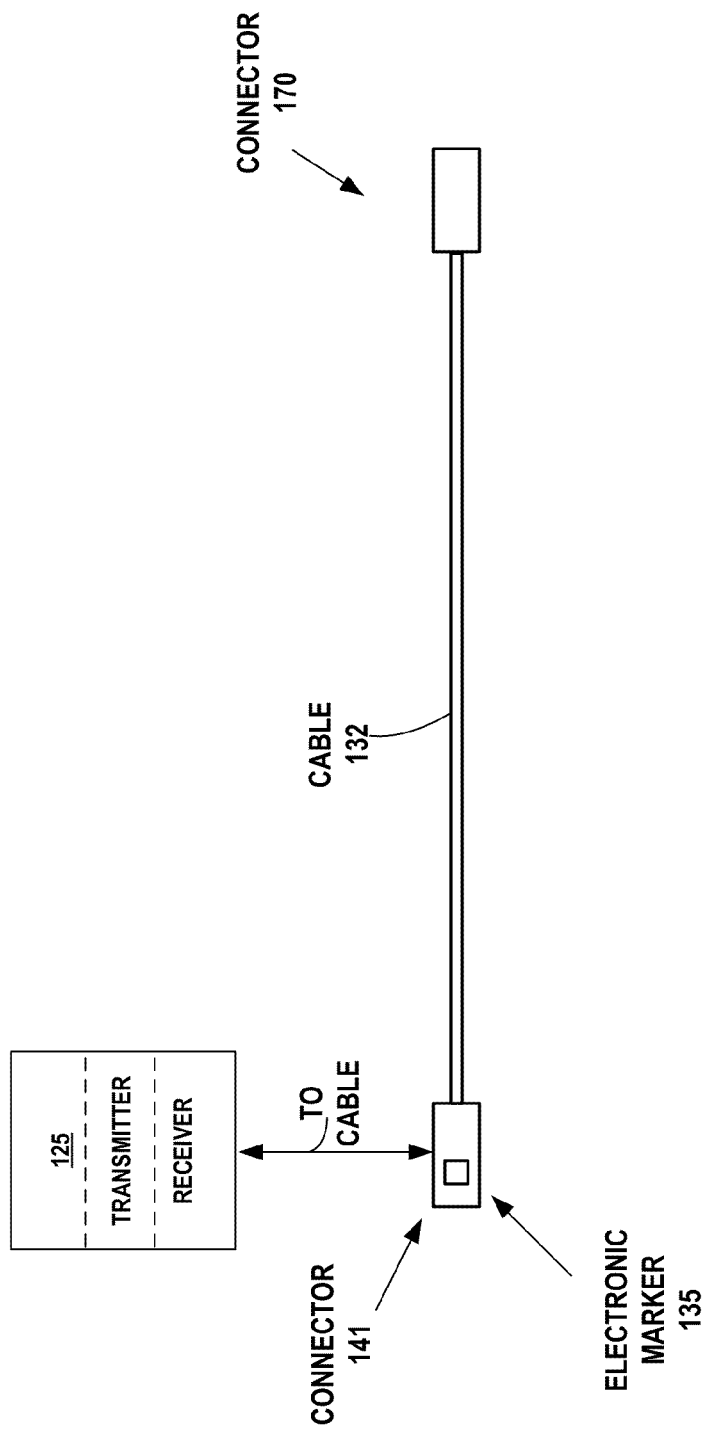
FIG. 3B is an example diagram illustrating the connector including an electronic marker as a cable indicator in accordance with an example embodiment of the invention.
Figure 3C:
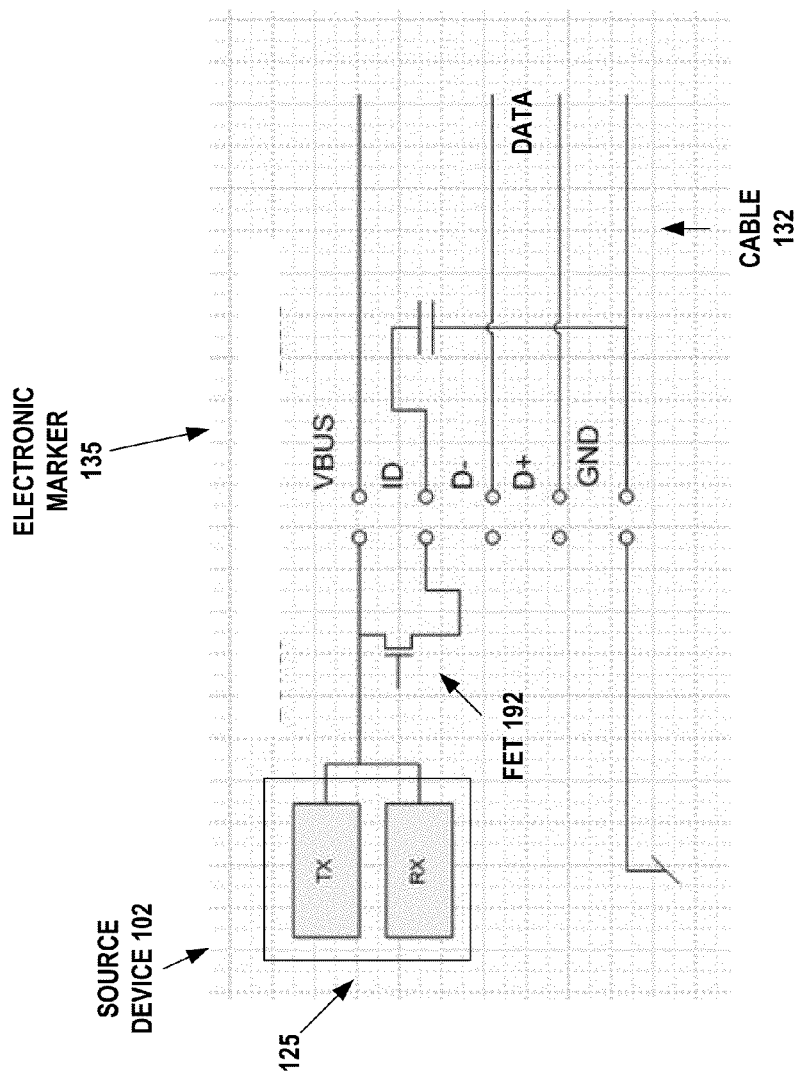
FIG. 3C is a circuit diagram of an example embodiment of the electronic marker with a capacitor in accordance with an example embodiment of the invention.
Figure 3D:
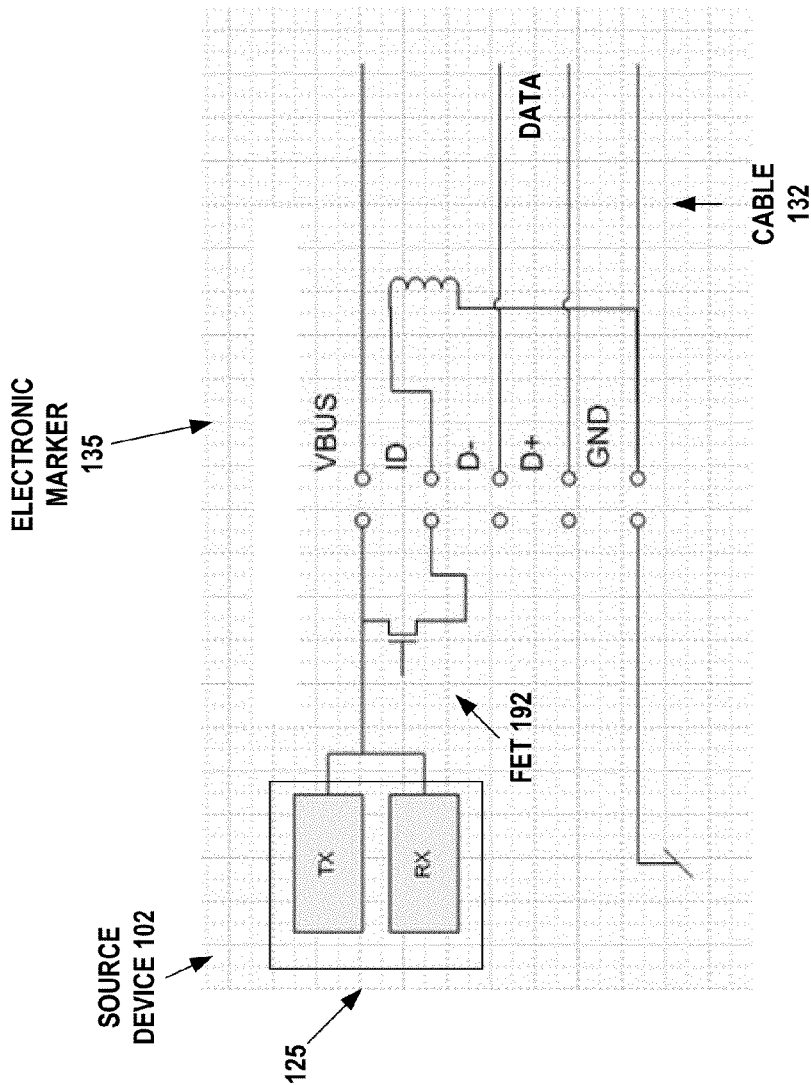
FIG. 3D is a circuit diagram of an example embodiment of the electronic marker with an inductance in accordance with an example embodiment of the invention.
Figure 3E:
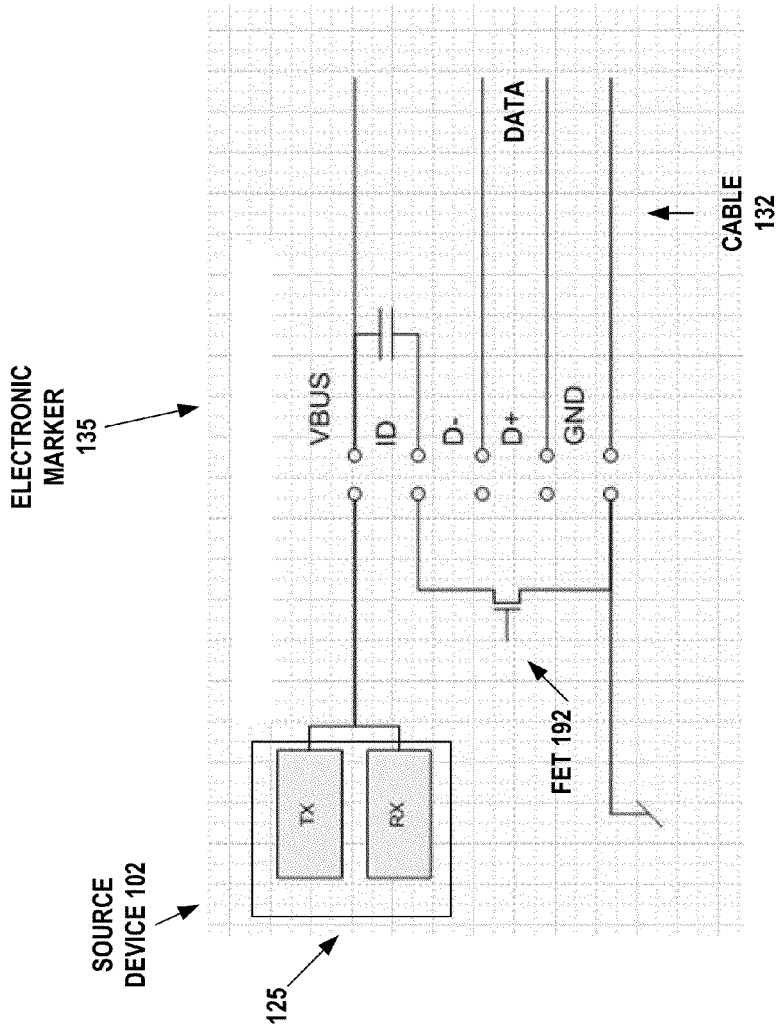
FIG. 3E is a circuit diagram of an example embodiment of the electronic marker with a capacitor in accordance with an example embodiment of the invention.
Figure 3F:
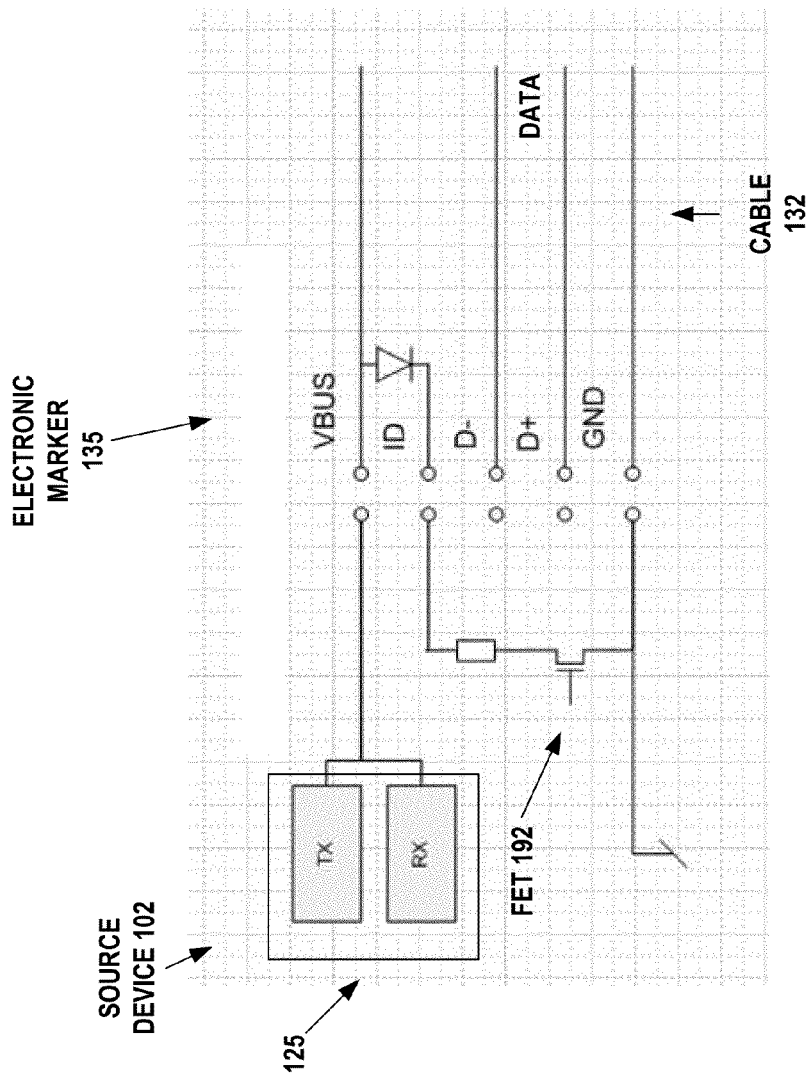
FIG. 3F is a circuit diagram of an example embodiment of the electronic marker with a diode and resistor in accordance with an example embodiment of the invention.
Figure 3G:
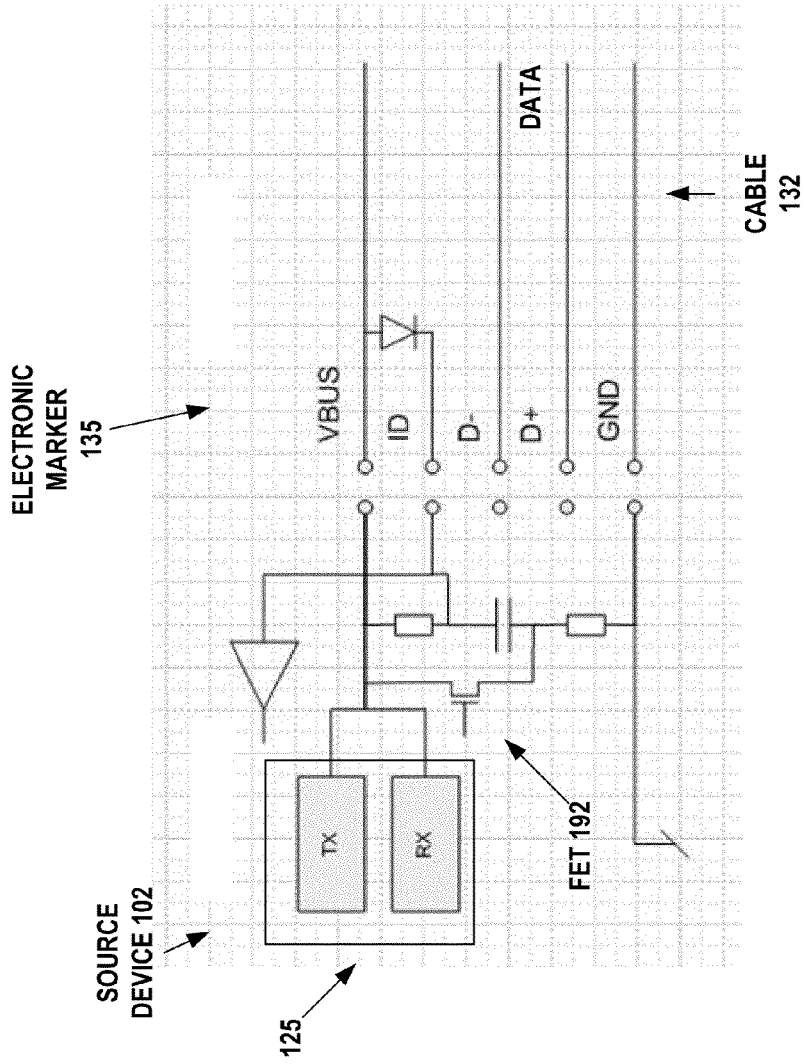
FIG. 3G is a circuit diagram of an example embodiment of the electronic marker with a pull-down resistor selectively switched onto power conductor by the host device via the FET, in accordance with an example embodiment of the invention.
Figure 3H:
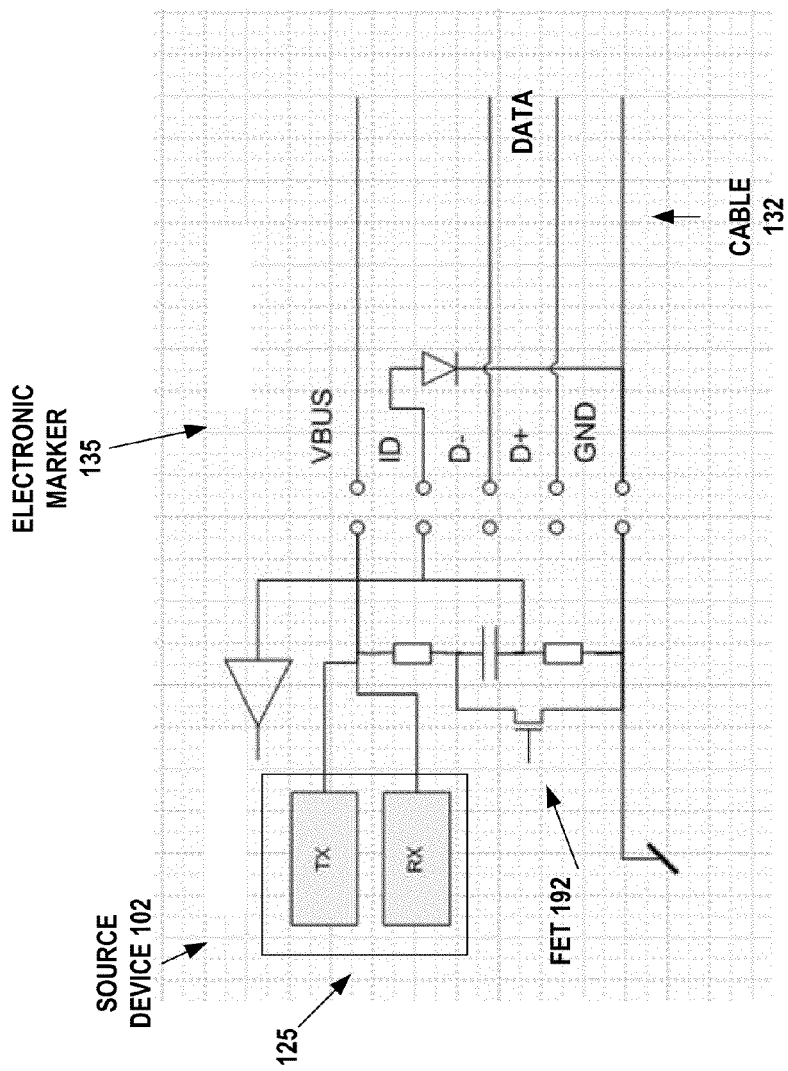
FIG. 3H is a circuit diagram of an example embodiment of the electronic marker, with a pull-down resistor selectively switched onto the power conductor by the host device via the FET, in accordance with an example embodiment of the invention.
Figure 3I:
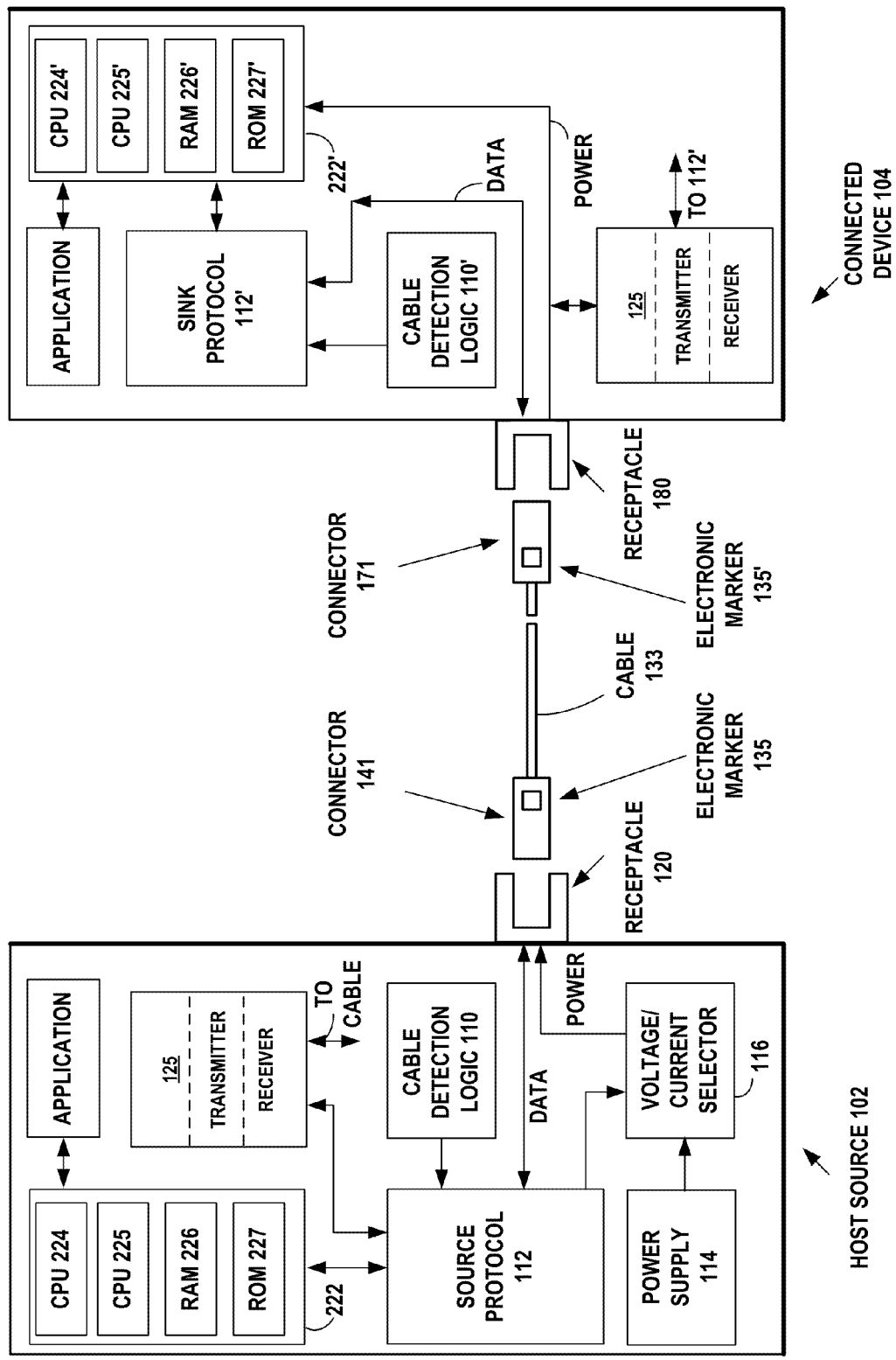
FIG. 3I illustrates an example functional block diagram of the host device and a connected device of FIG. 3A, wherein the connector includes an electronic marker, in accordance with an example embodiment of the invention.

The operation of the example embodiment shown in FIG. 3I, where the connector 170' includes an electronic marker 135 as a cable indicator, is shown in FIG. 2B flow diagram 270, according to an embodiment of the present invention.

Figure 4A:
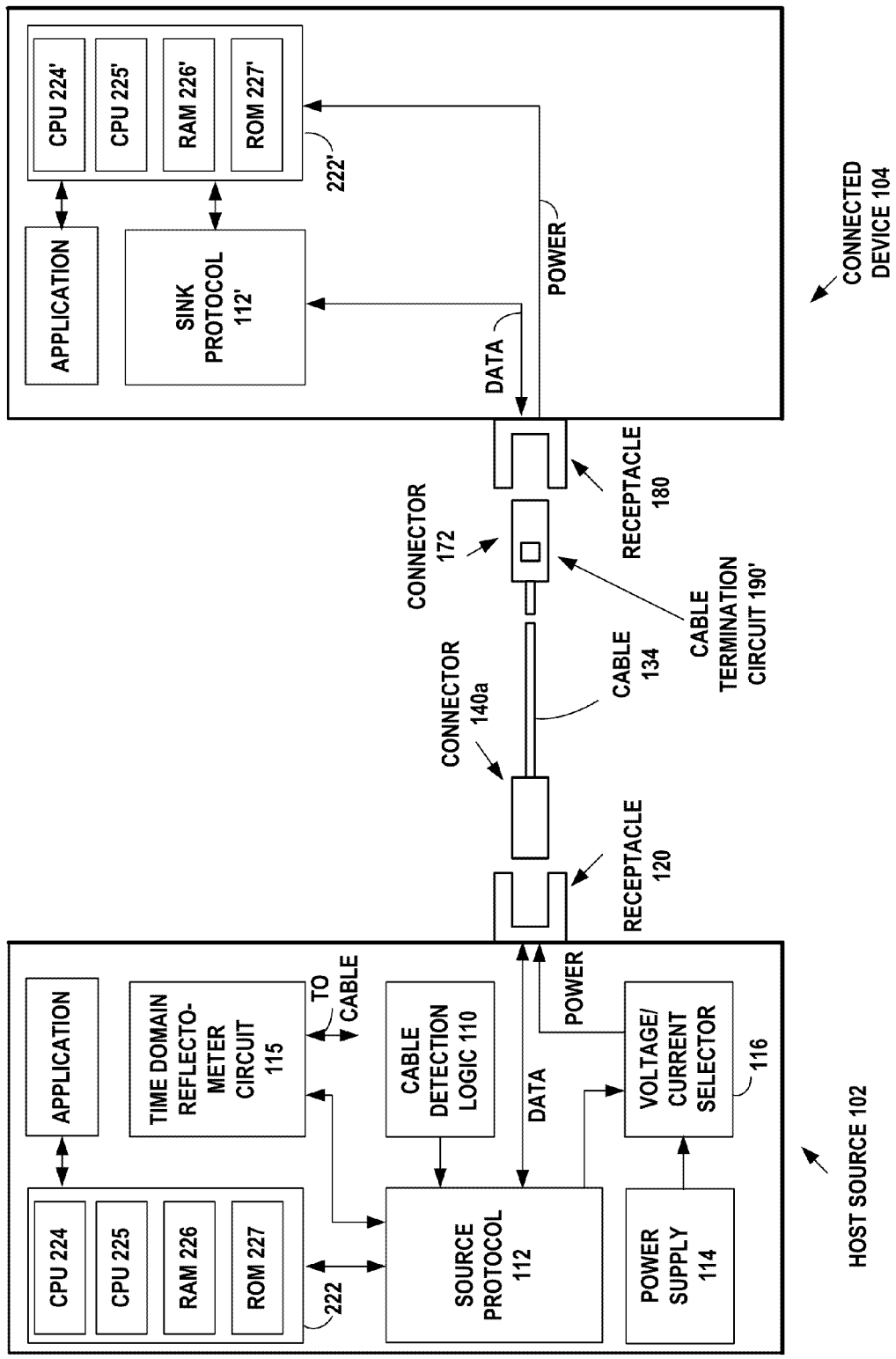
FIG. 4A illustrates an example functional block diagram of the host device and a connected device of FIG. 1A, wherein a time domain reflectometer circuit in the host device, is connected to the power conductor of the cable, in accordance with an example embodiment of the invention.

FIG. 3A illustrates an example functional block diagram of a host device 102 and a connected device 104 to be connected by the cable 132, such as for example a USB cable. The connector 141 includes an electronic marker 135 as a cable indicator that indicates the cable 132 is capable of conducting an elevated power level above the level of a legacy cable, in accordance with an example embodiment of the invention. The transmitter (TX) and receiver (RX) 125 are connected to the Vbus of the cable 132. The transmitter and receiver operate at 20 MHz (RF), so that a capacitor connected to the Vbus appears as a short circuit at that frequency and the receiver includes a voltage level detection circuit. The transmitter and receiver are operated at this high frequency to enable them to work with legacy standards without affecting existing equipment, and yet still provide more information with newer equipment. The operation where the connector 141 includes an electronic marker 135 as a cable indicator is shown in FIG. 1C flow diagram 250, according to an embodiment of the present invention. Refer to FIG. 4A for an example where the electronic marker is on the opposite end of the cable and refer to FIG. 5A for an example where there are electronic markers on both ends of the cable.

The host source device 102 of FIG. 3A includes at least one processor 224 and 225, at least one memory 226 and 227 including computer program code, the at least one memory and the computer program code configured to, with the at least one processor, cause the connected device at least to:

determine whether a connector 141 includes an electronic marker cable indication 135 that indicates its cable 132 is capable of conducting an elevated power level above a level of a legacy cable;

transmit an offer to a device 104 connected by the cable 132, to provide one or more supported power capabilities above the level of a legacy cable, if the electronic marker cable indication 135 is determined to indicate that the cable is capable of conducting an elevated power level above the level of a legacy cable; and transmit an offer to a device 104 connected by the cable 132, to provide the power level of a legacy cable, if the electronic marker cable indication 135 is determined to indicate that the cable is not capable of conducting an elevated power level above the level of a legacy cable.

FIG. 3B is an example diagram illustrating the connector 141 including the electronic marker 135 as a cable indicator that indicates the cable is capable of conducting an elevated power level above the level of a legacy cable, in accordance with an example embodiment of the invention.

FIG. 3C is a circuit diagram of an example embodiment of the electronic marker 135, with a capacitor selectively switched onto the power conductor, such as for example VBus by the host device 102 via the field effect transistor (FET) 192, in accordance with an example embodiment of the invention. Detection is made by enabling the TX and looking for an RX level using the receiver. After turning on the FET, the level should almost reach zero if there is a marker number 1 in the cable. The data conductor is presented in the example embodiment as differential data conductors D+ and D− that are used for serial bidirectional communication. Further in the embodiment an identification (ID) conductor is provided to enable identification of the cable side. For example on one side the ID conductor is not connected it is floating.

FIG. 3D is a circuit diagram of an example embodiment of the electronic marker 135, with an inductance selectively switched onto the power conductor, such as for example VBus by the host device via the FET, in accordance with an example embodiment of the invention. The presented marker in FIG. 3D may be used in an exemplary embodiment in a USB micro-A connector. USB micro-A connector has its ID pin 4 grounded with smaller than 10 Ohms. Direct current (DC) detection may be done for that with a short detection from the ID-pin to GND. But, with a 20 MHz system the inductor may be detected differently than for a short at DC. The steps for that are:

turn FET 192 OFF (not conducting)
turn on the TX
read the level from the RX
turn on the FET 192 (conducting)
read the level from the RX If the new level is much lower than the first reading, there is a short from ID to GND, if the level is slightly lower, there is an inductor from ID to GND. This may be used to identify a marker number 2

FIG. 3E is a circuit diagram of an example embodiment of the electronic marker 135, with a capacitor selectively switched onto the power conductor by the host device via the FET, in accordance with an example embodiment of the invention. Detection is made by enabling the TX and looking for an RX-level using the receiver. After turning on the FET, the level should almost reach zero if there is a marker number 3 in the cable.

FIG. 3F is a circuit diagram of an example embodiment of the electronic marker 135, with a diode and resistor selectively switched onto the power conductor by the host device via the FET, in accordance with an example embodiment of the invention. When the FET is turned on, the voltage on the comparator can go to low or stay high, depending on whether the diode is present. This may be used to identify a marker number 4.

FIG. 3G is a circuit diagram of an example embodiment of the electronic marker 135, with a pull-down resistor selectively switched onto the power conductor by the host device via the FET, in accordance with an example embodiment of the invention. When the FET is turned on, the voltage on the comparator can go to 10V or to 6V, depending on whether the diode is present. This may be used to identify a marker number 5.

FIG. 3H is a circuit diagram of an example embodiment of the electronic marker 135, with a pull-down resistor selectively switched onto the power conductor by the host device via the FET, in accordance with an example embodiment of the invention. When the FET is turned on, the voltage on the comparator can go to −0.6V or to −5V, depending on whether the diode is present. This may be used to identify a marker number 6.

The presented examples in FIG. 3C to 3H may be used in parallel. So that different markers may be identified at the same time. Or this combination maybe used to identify some further markers. Some of the combination shall not be used together on the same cable at the same time. For example marker from FIG. 3C and FIG. 3E may not used on the same cable at the same time. Also a combination of marker as presented in FIG. 3F and FIG. 3H shall not be used together on the same cable.

FIG. 3I illustrates an example functional block diagram of the host device 102 and a connected device 104 of FIG. 3A, wherein the connector 171, such as for example a USB type-B connector, includes an electronic marker 135' that indicates the cable 133 is capable of conducting an elevated power level above the level of a legacy cable, in accordance with an example embodiment of the invention. The transmitter (TX) and receiver (RX) 125' are connected to the power conductor, such as for example Vbus, of the cable 133. The transmitter and receiver operate at 20 MHz (RF), so that a capacitor connected to the power conductor appears as a short circuit at that frequency and the receiver includes a voltage level detection circuit. The transmitter and receiver 125' are operated at this high frequency to enable them to work with legacy standards without affecting existing equipment, and yet still provide more information with newer equipment. The operation where the connector 171 includes an electronic marker 135 as a cable indicator is the process flow shown in FIG. 2B flow diagram 270, according to an embodiment of the present invention.

The connected device 104 of FIG. 3I includes at least one processor 224' and 225', at least one memory 226' and 227' including computer program code, the at least one memory and the computer program code configured to, with the at least one processor, cause the connected device at least to:

receive an offer from a source device 102 connected by a cable 133, to provide one or more supported power capabilities above the level of a legacy cable;

determine whether a connector 171 of the cable, includes an electronic marker cable indication 135' that indicates the cable is capable of conducting an elevated power level above a level of a legacy cable;

transmit an acceptance to the source device 102, to accept a supported power capability above the level of a legacy cable, if the electronic marker cable indication 135' is determined to indicate that the cable is capable of conducting an elevated power level above the level of a legacy cable; and transmit a selection of a power level of a legacy cable, to the source device 102, if the electronic marker cable indication 135' is determined to indicate that the cable is not capable of conducting an elevated power level above the level of a legacy cable.

In an exemplary embodiment an electronically marked cable may be either a marked standard connector or one of a mini and a micro marked connector via the ID pin.

FIG. 4A illustrates an example functional block diagram of the host device 102 and a connected device 104 of FIG. 1A, wherein a time domain reflectometer (TDR) circuit 115 in the host device 102, is connected to the power conductor of the cable 134. The connector 172, such as for example USB type-B connector, at the opposite end of the cable 134 includes a cable termination circuit 190' that indicates whether the cable 134 is capable of conducting an elevated power level above the level of a legacy cable. The reflected signal returned to the time domain reflectometer circuit 115 in the host device 102 indicates whether the cable 134 is capable of conducting an elevated power level above the level of a legacy cable. If the indication is that the cable 134 is capable of handling one or more elevated power levels, then the source protocol 112 may offer to the connected device 104, one or more supported power capabilities above the level of a legacy cable, in accordance with an example embodiment of the invention. The one or more supported power capabilities may be for example one of high voltage capability, high current capability and extra high current capability. Alternately, if the indication is that the cable 134 is not capable of handling elevated power levels, then the source protocol 112 limits to only the level of a legacy cable, in accordance with an example embodiment of the invention.

Figure 4B:
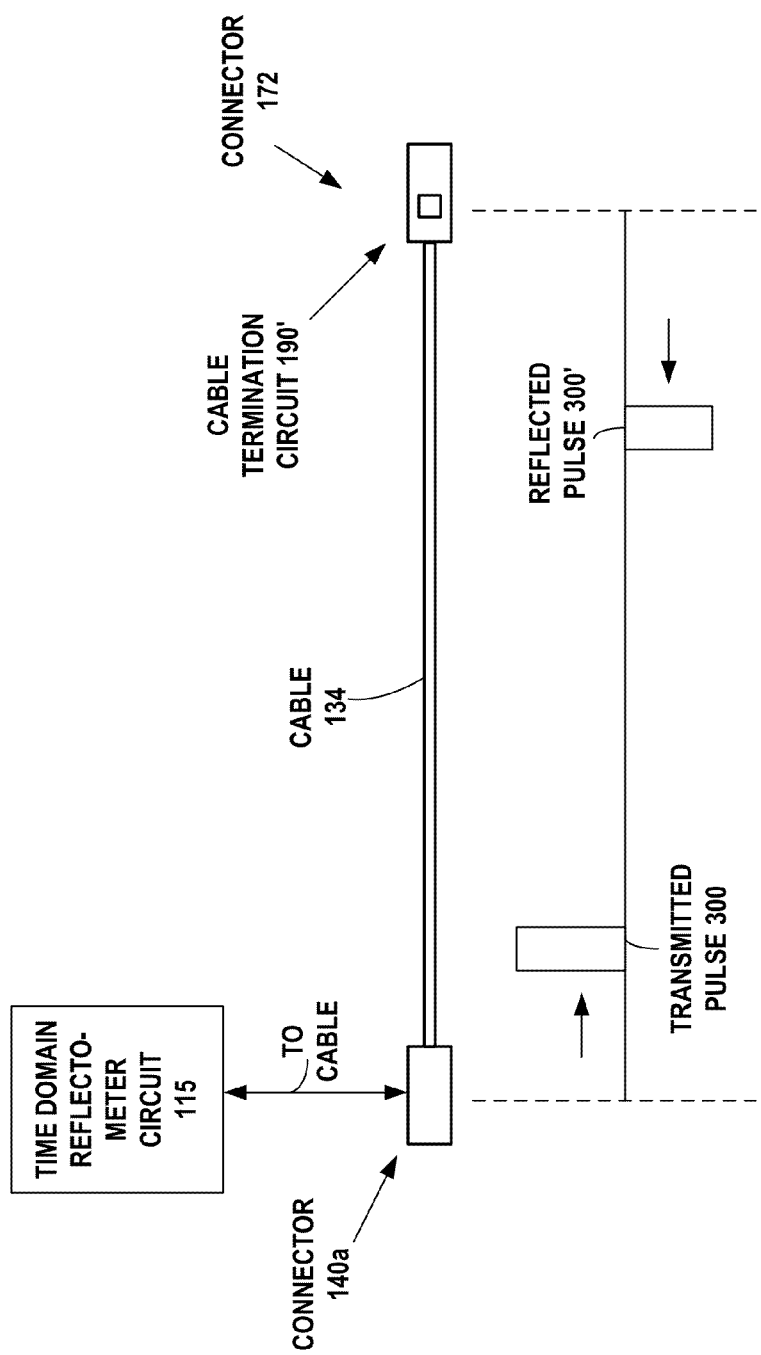
FIG. 4B is an example diagram illustrating the transmission by the time domain reflectometer circuit of a pulse through the connector and through the cable, acting as a transmission conductor with characteristic impedance, in accordance with an example embodiment of the invention.

FIG. 4B is an example diagram illustrating the transmission by the time domain reflectometer (TDR) circuit 115 of a pulse 300 through the connector 140a and through the cable 134, acting as a transmission conductor with a characteristic impedance. The transmitted pulse 300 is reflected by the cable termination circuit 190' having termination impedance selected to indicate whether the cable 134 is capable of handling elevated power levels above the level of a legacy cable. The magnitude of the terminating impedance may be selected to indicate one of several possible power level capacities of the cable 134. The reflected pulse 300' has an amplitude, width, polarity, and shape that corresponds to the selected magnitude of the terminating impedance of the cable termination circuit 190'. The reflected pulse 300' is received by the time domain reflectometer circuit 115 and measured for its amplitude, width, polarity, and/or shape to determine whether the cable 134 is capable of handling elevated power levels above the level of a legacy cable. The selected magnitude of the terminating impedance of the cable termination circuit 190' may be inferred from the measurements to indicate one of several possible power level capacities of the cable 134, in accordance with an example embodiment of the invention.

TDR Methods

One of the following three methods may be used if the time domain reflectometer (TDR) circuit 115 is utilized as a cable detection method. Terminations 1 and 2 (cable termination circuits 190' and 190) are taken to be one of either an inductive or capacitive termination. The cable detection Process 2, below, specifically requires that Termination 1 is an inductor, since communication is not possible with the capacitive termination in place. To clarify TDR processes 1-3 present three alternative ways of using the time domain reflectometer (TDR) circuit 115 to negotiate power capabilities.

Cable detection process 1 takes the maximum possible time. The TDR has to wait the maximum time for the longest cable before making each of the two measurements. Timing is fixed and communication is minimal.

Cable detection process 2 improves on this method by using the fact that communication is possible when the inductor termination is in place (it is not possible when the capacitive termination is in place). The end of the first TDR measurement is marked by a message that the device with the terminations may then use to set the timing for the second measurement. This is an overall improvement since it reduces the time taken for the TDR. If the cable is removed or changed during the measurement it is assumed that this can be detected using a device identifier.

Cable detection process 3 takes a different approach by breaking the measurement up into timeslots (for example in 100 ms) each followed by messaging. This allows the TDR to be reduced to a fairly optimal time down to the resolution of the timeslots. There is also a handshake between each measurement which enables detection of cases where the cable is removed or changed during the measurement without the need for an identifier provided the timeslots are sufficiently short.

Cable Detection Process 1 with TDR
1. Cable attachment at both ends
2. Source (host source 102) sends a request to the sink end (connected device 104) to start TDR
3. Source receives an accept from the sink end
   a. Sink termination 1 (for example inductor or capacitor) is assumed to be in place for x seconds*
   b. Sink termination 2 (for example capacitor or inductor) is assumed to be in place for x seconds*
4. Source offers power capabilities based on detected cable
5. Sink sends a request to the sink end to start TDR
6. Sink receives one or more accept from the source
   a. Source termination 1 (for example inductor or capacitor) is assumed to be in place for x seconds*
   b. Source termination 2 (for example capacitor or inductor) is assumed to be in place for x seconds*
7. Source receives a capabilities request from the sink indicating the selected capability
   * x is assumed to be sufficiently long top detect the longest possible cable (5 m)
   Steps 4-6 are only necessary if the source offers greater than legacy power and this is required by the sink
   Example of messages used by process 1:
   1. Step 2: TDR start message
   2. Step 3: Accept message
   3. Step 4: Capabilities message
   4. Step 5: TDR start message
   5. Step 6: Accept message
   6. Step 7: Capabilities request message Cable Detection Process 2 with TDR
1. Cable attachment at both ends
2. Source sends a request to the sink end to start TDR
3. Accept received from the sink
   a. Sink termination 1 (for example inductor) is in place
4. Source sends a message indicating that first TDR has been completed
5. Source receives an Accept from the sink
   a. Sink termination 2 (for example capacitor) is assumed to be in place for the same timing as the first measurement. Sink had measured the time from the start of the measurement to end based on messages and uses this for the timing of the second termination.
6. Source offers power capabilities based on detected cable
7. Sink sends a request to the source to start TDR
8. Accept received from the source
   a. Source termination 1 (for example inductor) is in place
9. Sink sends a message indicating that first TDR has been completed
10. Sink receives an accept from the source
    a. Source termination 2 (for example capacitor) is assumed to be in place for the same timing as the first measurement. Source had measured the time from the start of the measurement to end based on messages and uses this for the timing of the second termination.
11. Source receives a response from sink indicating the selected capability
    Steps 7-10 are only necessary if the source offers greater than legacy power and this is required by the sink
    Example of messages used by process 2:
    1. Step 2: TDR start message
    2. Step 3: Accept message
    3. Step 4: 1st TDR complete message
    4. Step 5: Accept message
    5. Step 6: Capabilities message
    6. Step 7: TDR start message
    7. Step 8: Accept message
    8. Step 9: 1st TDR complete message
    9. Step 10: Accept message
    10. Step 7: Capabilities request message Cable Detection Process 3 with TDR
1. Cable attachment at both ends
2. Source sends a request to the sink end to enable termination 1
3. Accept received from the sink
   a. Sink Termination 1 (for example inductor or capacitor) is in place for example for 100 ms
4. Source sends repeated requests to the sink to re-enable termination 1 until the measurement is completed
5. Source sends a request to the sink end to enable termination 2
6. Accept received from the sink
   a. Sink Termination 2 (for example capacitor or inductor) is in place for example for 100 ms
7. Source sends repeated requests to the sink to re-enable termination 2 until the measurement is completed
8. Source offers power capabilities based on detected cable
9. Sink sends a request to the source end to enable termination 1
10. Accept received from the source
    a. Source Termination 1 (for example inductor or capacitor) is in place for example for 100 ms
11. Sink sends repeated requests to the source to re-enable termination 1 until the measurement is completed
12. Sink sends a request to the source end to enable termination 2
13. Accept received from the source
    a. Source Termination 2 (for example capacitor or inductor) is in place for example for 100 ms
14. Sink sends repeated requests to the source to re-enable termination 2 until the measurement is completed
15. Source receives a response from the sink indicating the selected capability
    Steps 9-14 are only necessary if the source offers greater than legacy power and this is required by the sink. They can also be skipped if the sink is happy to accept the results of the source's TDR measurement and assessment of the cable's capabilities.
    Example of messages used by process 2:
    1. Step 2: Enable TDR termination 1 message
    2. Step 3: One or more accept message(s)
    3. Step 4: Enable TDR termination 1 one or more message(s) followed by Accept message(s)
    4. Step 5: Enable TDR termination 2 message
    5. Step 6: Accept message
    6. Step 7: Enable TDR termination 2 one or more message(s) followed by one or more accept message(s)
    7. Step 8: Power capabilities message
    8. Step 9: Enable TDR termination 1 message 9. Step 10: One or more accept message(s)

10. Step 11: Enable TDR termination 1 one or more message(s) followed by one or more accept message(s)

11. Step 5: Enable TDR termination 2 message

12. Step 6: One or more accept message(s)

13. Step 7: Enable TDR termination 2 one or more message(s) followed by one or more accept message(s)

14. Step 7: Capabilities request message

Message Header

Every message starts with a 16-bit header which contains the basic information used by the Physical Layer to send the message and is used by its port partner to consume it. The header may be used standalone as a control message when the message length field is zero or as the first part of a data message when the message length field is non-zero. The messages may be transmitted from a first device to a connected device via data lines using half-duplex or full-duplex differential signaling.

TABLE

Message Header

| Bit(s) | Description |
|---|---|
| B15.12 | Message length - number of 4-byte power (data) objects being sent. |
| B11.9 | MessageID - a rolling counter maintained by the message's originator. It is initialized to zero at power-on or reset and incremented when a message is successfully received as indicated by receipt of a Good CRC message. |
| B8 | Port<br>0b A-side<br>1b B-side (including captive cable) |
| B7 | Port's operational role<br>0b Consumer<br>1b Provider |
| B6.5 | Specification Revision<br>00b - Header and message<br>01b-11b - Reserved |
| B4 | Reserved - may be set to 0 |
| B3.0 | Message Type |

Control Message

A message is defined as a control message when the message length field in the header is set to 0. The control message itself consists only of a message header and a CRC. A control message is originated by the Protocol Layer (i.e. Accept, Reject etc.) with the exception of a GoodCRC which may be optionally originated by the Physical Layer.

The control message type is defined by the Header's Message Type (B3.0) and are summarized in the following table.

TABLE

Control Message Types

| Bits 3.0 | Type | Sent by | Description |
|---|---|---|---|
| 0000 | Reserved | N/A | All values not explicitly defined are reserved and may not be used. |
| 0001 | GoodCRC | Protocol Layer | Acknowledges previous Message had good CRC (e.g. was received correctly) |
| 0010 | Reserved | N/A | All values not explicitly defined are reserved and may not be used. |
| 0011 | Accept | Protocol Layer (Source only) | Sent by the Source in response to a Request signaling its acceptance of the request. |
| 0100 | Reject | Protocol Layer (Source only) | Sent by the Source in response to a Request signaling it cannot accept the request. May be sent in response to an error in the request or because the Source can no longer provide what it previously advertised. |
| 0101 | KeepAlive | Protocol Layer (Sink only) | Sent periodically by the Sink to indicate its continued presence to the Source. Sinks are required to periodically send this message. |
| 0110 | PS_RDY | Protocol Layer (Source only) | Sent with the Power supply is ready to source the requested voltage and current. |
| 0111 | Get_Source_Cap | Protocol Layer | Sent in response to a request of a port's capabilities when it acts as a Source. |
| 1000 | Get_Sink_Cap | Protocol Layer | Sent in response to a request of a port's capabilities when it acts as a Sink. |
| 1001 | Protocol Error | Protocol Layer | Sent by recipient to inform sender that it has encountered an error, such as an unrecognized command. |
| 1010 | Swap | Protocol Layer | Sent by either the Source or Sink to its port partner requesting the initiation of a swap sequence. |
| 1011 | AcceptSwap | Protocol Layer | Returned by the recipient of a Swap message signaling its agreement to swap roles AND that it has begun the swap sequence. |
| 1100 | RejectSwap | Protocol Layer | Returned by the recipient of a Swap message signaling it is not capable of doing a swap at this time. |
| 1101 | Reset | Protocol Layer | Sent by either the Source or Sink to its port partner requesting a soft reset. |
| 1110-1111 | Reserved | N/A | All values not explicitly defined are reserved and may not be used. |

New Control Message Types

New control message types are defined for each of the different processes independently:

Cable detection process 1 with TDR
  TDR start message
Cable detection process 2 with TDR
  TDR start message
  1$^{st}$ TDR complete message
Cable detection process 3 with TDR
  Enable TDR termination 1 message
  Enable TDR termination 2 message For the definition of the new messages for cable detection process 1 to 3, any of the two reserved locations (1110 & 1111) in the control message may be used. Depending on the process, either one or two messages are needed.

Figure 4C:
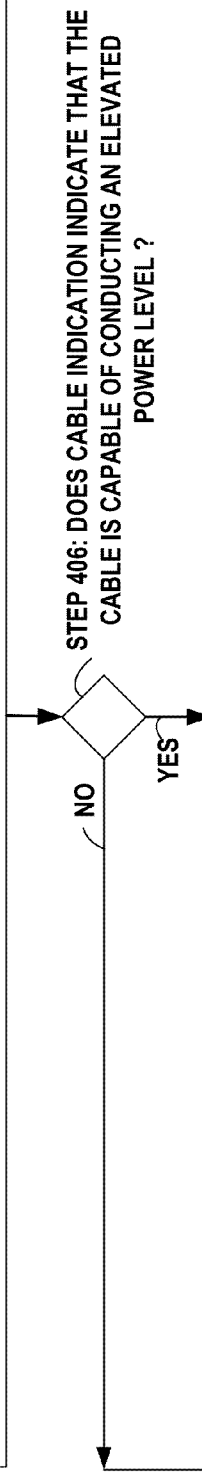
FIG. 4C is an example flow diagram of operational steps of an example embodiment of the procedure performed in the host device of FIG. 4A, according to an embodiment of the present invention.

FIG. 4C is an example flow diagram 400 of operational steps of an example embodiment of the procedure performed in the host device 102 of FIG. 4A, according to an embodiment of the present invention. An example of steps in the procedure carried out by the host device 102 in executing-in-place program code stored in the memory of the device. The steps in the procedure of the flow diagram may be embodied as program logic stored in the memory of the device in the form of sequences of programmed instructions which, when executed in the processing logic of the device, carry out the functions of an exemplary disclosed embodiment. Alternately, some or all of the steps in the procedure of the flow diagram may be embodied as hardware program logic included in programmed logic arrays of sequential and/or combinatorial logic circuits and/or state machine logic implementing some or all of the steps performed by embodiments of the invention. The steps may be carried out in another order than shown and individual steps may be combined or separated into component steps. Additional steps may be inserted into this sequence. The steps in the procedure are as follows:

Step 402: transmitting a message to a connected device over a cable, requesting a switching of a power conductor in the cable to a termination circuit that includes a cable indication that indicates whether the cable is capable of conducting an elevated power level above a level of a legacy cable Step 404: transmitting a signal over the power conductor to the termination circuit and measuring a reflected signal received over the power conductor from the termination circuit, indicating whether the cable is capable of conducting an elevated power level above a level of a legacy cable Step 406: does cable indication indicate that the cable is capable of conducting an elevated power level?

Step 408: transmitting an offer to the connected device, to provide one or more supported power capabilities above the level of a legacy cable, if the cable indication is determined to indicate that the cable is capable of conducting an elevated power level above the level of a legacy cable Step 410: transmitting an offer to the device connected, to provide a power level of a legacy cable, if the cable indication is determined to indicate that the cable is not capable of conducting an elevated power level above the level of a legacy cable.

Figure 5A:
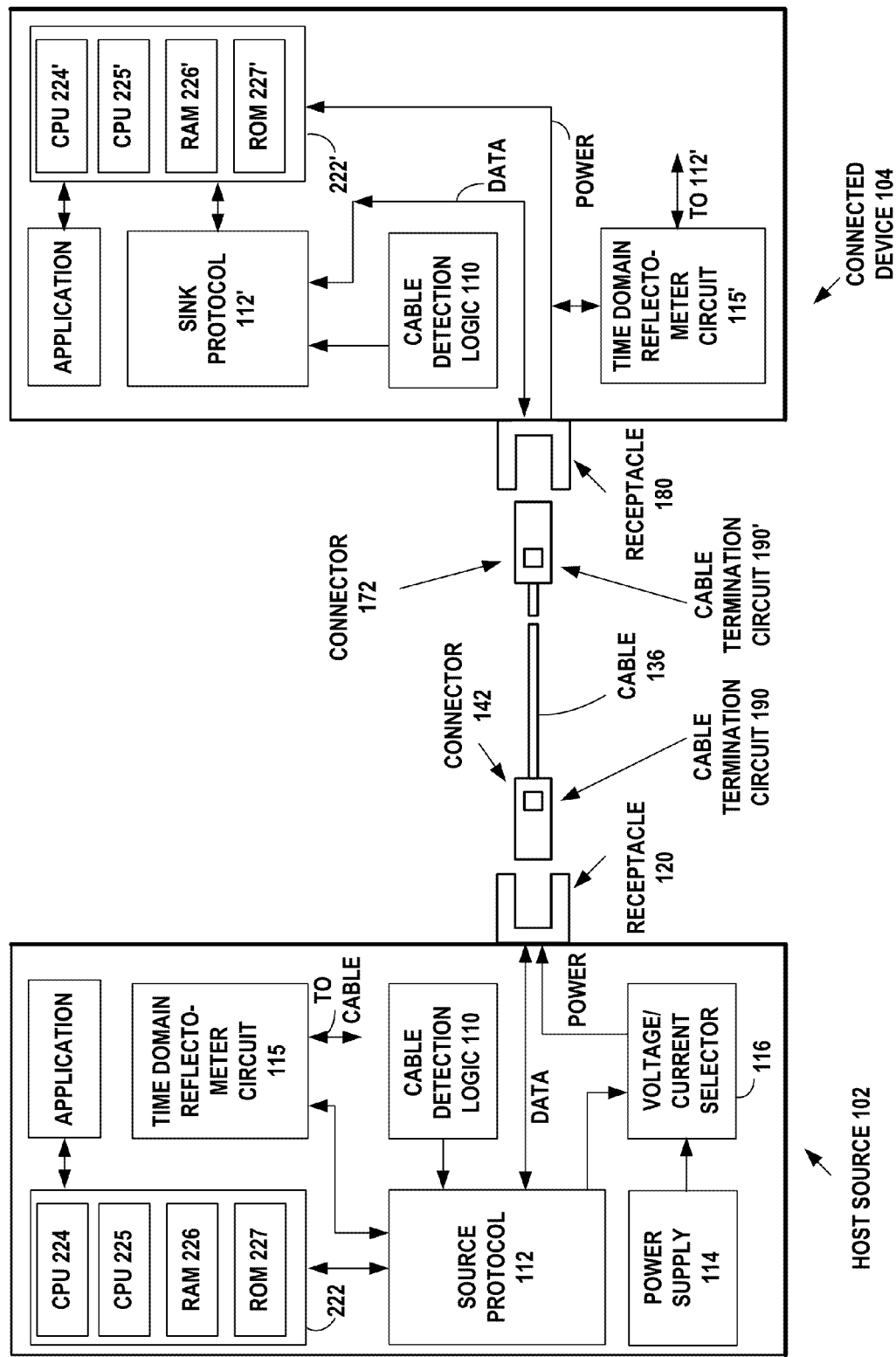
FIG. 5A illustrates an example functional block diagram of the host device and a connected device based on FIG. 4A, wherein a time domain reflectometer circuit in the connected device, is connected to the power conductor of the cable, in accordance with an example embodiment of the invention.

FIG. 5A illustrates an example functional block diagram of the host device 102 and a connected device 104 based on FIG. 4A, wherein a time domain reflectometer circuit 115' in the connected device 104, is connected to the power conductor of the cable 136. The connector 142 for example USB type-A connector at the opposite end of the cable 136 includes a cable termination circuit 190 that indicates whether the cable 136 is capable of conducting an elevated power level above the level of a legacy cable. The reflected signal returned to the time domain reflectometer circuit 115' in the connected device 104 indicates whether the cable is capable of conducting an elevated power level above the level of a legacy cable. If the indication is that the cable 136 is capable of handling elevated power levels, then the source protocol 112' may accept an offer from the host device 102, that it may accept one of the supported power capabilities of the host device 102, above the level of a legacy cable, in accordance with an example embodiment of the invention. Alternately, if the indication is that the cable 136 is not capable of handling elevated power levels, then the source protocol 112' limits any acceptance of offers to only the level of a legacy cable, in accordance with an example embodiment of the invention.

FIG. 5B is an example flow diagram 500 of operational steps of an example embodiment of the procedure performed in the connected device 104 of FIG. 5A, according to an embodiment of the present invention. An example of steps in the procedure carried out by the connected device 104 in executing-in-place program code stored in the memory of the device. The steps in the procedure of the flow diagram may be embodied as program logic stored in the memory of the device in the form of sequences of programmed instructions which, when executed in the processing logic of the device, carry out the functions of an exemplary disclosed embodiment. Alternately, some or all of the steps in the procedure of the flow diagram may be embodied as hardware program logic included in programmed logic arrays of sequential and/or combinatorial logic circuits and/or state machine logic implementing some or all of the steps performed by embodiments of the invention. The steps may be carried out in another order than shown and individual steps may be combined or separated into component steps. Additional steps may be inserted into this sequence. The steps in the procedure are as follows:

Step 502: receiving an offer from a host device connected by a cable, to provide one or more supported power capabilities above the level of a legacy cable Step 504: transmitting a message to a the host device over the cable, requesting a switching of a power conductor in the cable to a termination circuit that includes a cable indication that indicates whether the cable is capable of conducting an elevated power level above a level of a legacy cable Step 506: transmitting a signal over the power conductor to the termination circuit and measuring a reflected signal received over the power conductor from the termination circuit, indicating whether the cable is capable of conducting an elevated power level above a level of a legacy cable Step 508: does cable indication indicate that the cable is capable of conducting an elevated power level?

Step 510: transmitting an acceptance to the host device, to accept a supported power capability above the level of a legacy cable, if the cable indication is determined to indicate that the cable is capable of conducting an elevated power level above the level of a legacy cable Step 512: transmitting a selection of a power level of a legacy cable, to the host device, if the cable indication is determined to indicate that the cable is not capable of conducting an elevated power level above the level of a legacy cable.

In example embodiments of the invention, a connector at the opposite end of the cable from the first device, includes a cable termination circuit having a cable indication that indicates whether the cable is capable of conducting an elevated power level above the level of a legacy cable.

In example embodiments of the invention, a method comprises:

transmitting a request by a first device requesting a function be performed by a second device to enable detecting a cable indication that indicates whether a cable connecting the first and second devices is capable of conducting an elevated power level above a level of a legacy cable;

transmitting a signal through the cable to a termination circuit in a connector of the cable and receiving a reflected signal in response from the termination circuit, which indicates the cable indication;

transmitting an offer to the second device connected by the cable, to provide one or more supported power capabilities above the level of a legacy cable, if the cable indication is determined to indicate that the cable is capable of conducting an elevated power level above the level of a legacy cable; and transmitting an offer to the second device, to provide the power level of a legacy cable, if the cable indication is determined to indicate that the cable is not capable of conducting an elevated power level above the level of a legacy cable.

In example embodiments of the invention, the method further comprises:

receiving an acceptance of the offer to the second device, to provide a supported power capability above the level of a legacy cable, if the cable indication is determined to indicate that the cable is capable of conducting an elevated power level above the level of a legacy cable; and receiving an acceptance of the offer to the second device, to provide the power level of a legacy cable, if the cable indication is determined to indicate that the cable is not capable of conducting an elevated power level above the level of a legacy cable.

In example embodiments of the invention, the first device is to be connected to the second device by a universal serial bus cable having a universal serial bus connector at an opposite end of the cable from the first device, the universal serial bus connector including a cable termination circuit having the cable indication that indicates whether the universal serial bus cable is capable of conducting an elevated power level above the level of a legacy universal serial bus cable.

In example embodiments of the invention, a method comprises:

receiving at a second device a request from a first device requesting a function be performed to enable the first device to detect a cable indication of a cable connecting the first and second devices, the cable indication indicating whether the cable is capable of conducting an elevated power level above the level of a legacy cable;

performing the function to enable the first device to detect the cable indication;

receiving an offer from the first device connected by the cable, to provide one or more supported power capabilities above the level of a legacy cable, if the cable indication is determined to indicate that the cable is capable of conducting an elevated power level above the level of a legacy cable; and receiving an offer from the first device, to provide the power level of a legacy cable, if the cable indication is determined to indicate that the cable is not capable of conducting an elevated power level above the level of a legacy cable.

In example embodiments of the invention, the method further comprises:

determining whether a connector of the cable, includes a cable indication that indicates the cable is capable of conducting an elevated power level above a level of a legacy cable;

transmitting an acceptance to the first device, to accept a supported power capability above the level of a legacy cable, if the cable indication is determined to indicate that the cable is capable of conducting an elevated power level above the level of a legacy cable; and transmitting a selection of a power level of a legacy cable, to the first device, if the cable indication is determined to indicate that the cable is not capable of conducting an elevated power level above the level of a legacy cable.

In example embodiments of the invention, the first device is to be connected to the second device by a universal serial bus cable having a universal serial bus connector at an opposite end of the cable from the second device, the universal serial bus connector including a cable termination circuit having the cable indication that indicates whether the universal serial bus cable is capable of conducting an elevated power level above the level of a legacy universal serial bus cable.

In example embodiments of the invention, an apparatus comprises:

at least one processor;

at least one memory including computer program code;

the at least one memory and the computer program code configured to, with the at least one processor, cause the apparatus at least to:

transmit a request by the apparatus requesting a function be performed by a second device to enable detecting a cable indication that indicates whether a cable connecting the apparatus and second devices is capable of conducting an elevated power level above a level of a legacy cable;

transmit a signal through the cable to a termination circuit in a connector of the cable and receiving a reflected signal in response from the termination circuit, which indicates the cable indication;

transmit an offer to the second device connected by the cable, to provide one or more supported power capabilities above the level of a legacy cable, if the cable indication is determined to indicate that the cable is capable of conducting an elevated power level above the level of a legacy cable; and transmit an offer to the second device, to provide the power level of a legacy cable, if the cable indication is determined to indicate that the cable is not capable of conducting an elevated power level above the level of a legacy cable.

In example embodiments of the invention, the apparatus further comprises:

the at least one memory and the computer program code configured to, with the at least one processor, cause the apparatus at least to:

receive an acceptance of the offer to the second device, to provide a supported power capability above the level of a legacy cable, if the cable indication is determined to indicate that the cable is capable of conducting an elevated power level above the level of a legacy cable; and receive an acceptance of the offer to the second device, to provide the power level of a legacy cable, if the cable indication is determined to indicate that the cable is not capable of conducting an elevated power level above the level of a legacy cable.

In example embodiments of the invention, an apparatus comprises:

at least one processor;

at least one memory including computer program code;

the at least one memory and the computer program code configured to, with the at least one processor, cause the apparatus at least to:

receive at the apparatus a request from a first device requesting a function be performed to enable the first device to detect a cable indication of a cable connecting the first device and the apparatus, the cable indication indicating whether the cable is capable of conducting an elevated power level above the level of a legacy cable;

perform the function to enable the first device to detect the cable indication;

receive an offer from the first device connected by the cable, to provide one or more supported power capabilities above the level of a legacy cable, if the cable indication is determined to indicate that the cable is capable of conducting an elevated power level above the level of a legacy cable; and receive an offer from the first device, to provide the power level of a legacy cable, if the cable indication is determined to indicate that the cable is not capable of conducting an elevated power level above the level of a legacy cable.

In example embodiments of the invention, the apparatus further comprises:

the at least one memory and the computer program code configured to, with the at least one processor, cause the apparatus at least to:

determine whether a connector of the cable, includes a cable indication that indicates the cable is capable of conducting an elevated power level above a level of a legacy cable;

transmit an acceptance to the first device, to accept a supported power capability above the level of a legacy cable, if the cable indication is determined to indicate that the cable is capable of conducting an elevated power level above the level of a legacy cable; and transmit a selection of a power level of a legacy cable, to the first device, if the cable indication is determined to indicate that the cable is not capable of conducting an elevated power level above the level of a legacy cable.

In example embodiments of the invention, a computer program product comprises computer executable program code recorded on a computer readable, non-transitory storage medium, the computer executable program code, when executed by a computer processor, performing the steps, comprising:

transmitting a request by a first device requesting a function be performed by a second device to enable detecting a cable indication that indicates whether a cable connecting the first and second devices is capable of conducting an elevated power level above a level of a legacy cable;

transmitting a signal through the cable to a termination circuit in a connector of the cable and receiving a reflected signal in response from the termination circuit, which indicates the cable indication;

transmitting an offer to the second device connected by the cable, to provide one or more supported power capabilities above the level of a legacy cable, if the cable indication is determined to indicate that the cable is capable of conducting an elevated power level above the level of a legacy cable; and transmitting an offer to the second device, to provide the power level of a legacy cable, if the cable indication is determined to indicate that the cable is not capable of conducting an elevated power level above the level of a legacy cable.

In example embodiments of the invention, a computer program product comprises computer executable program code recorded on a computer readable, non-transitory storage medium, the computer executable program code, when executed by a computer processor, performing the steps, comprising:

receiving at a second device a request from a first device requesting a function be performed to enable the first device to detect a cable indication of a cable connecting the first and second devices, the cable indication indicating whether the cable is capable of conducting an elevated power level above the level of a legacy cable;

performing the function to enable the first device to detect the cable indication;

receiving an offer from the first device connected by the cable, to provide one or more supported power capabilities above the level of a legacy cable, if the cable indication is determined to indicate that the cable is capable of conducting an elevated power level above the level of a legacy cable; and receiving an offer from the first device, to provide the power level of a legacy cable, if the cable indication is determined to indicate that the cable is not capable of conducting an elevated power level above the level of a legacy cable.

In example embodiments of the invention, a connector at the opposite end of the cable from the first device, includes a cable termination circuit having a cable indication that indicates whether the cable is capable of conducting an elevated power level above the level of a legacy cable. Example methods, apparatus, and computer program products include the following.

An example method comprises:

transmitting a request by a first device requesting a function be performed by a second device to enable detecting a cable indication that indicates whether a cable connecting the first and second devices is capable of conducting an elevated power level above a level of a legacy cable;

transmitting a signal through the cable to a termination circuit in a connector of the cable and receiving a reflected signal in response from the termination circuit, which indicates the cable indication;

transmitting an offer to the second device connected by the cable, to provide one or more supported power capabilities above the level of a legacy cable, if the cable indication is determined to indicate that the cable is capable of conducting an elevated power level above the level of a legacy cable; and transmitting an offer to the second device, to provide the power level of a legacy cable, if the cable indication is determined to indicate that the cable is not capable of conducting an elevated power level above the level of a legacy cable.

The example method further comprises:

receiving an acceptance of the offer to the second device, to provide a supported power capability above the level of a legacy cable, if the cable indication is determined to indicate that the cable is capable of conducting an elevated power level above the level of a legacy cable; and receiving an acceptance of the offer to the second device, to provide the power level of a legacy cable, if the cable indication is determined to indicate that the cable is not capable of conducting an elevated power level above the level of a legacy cable.

The example method further comprises: wherein the first device is to be connected to the second device by a universal serial bus cable having a universal serial bus connector at an opposite end of the cable from the first device, the universal serial bus connector including a cable termination circuit having the cable indication that indicates whether the universal serial bus cable is capable of conducting an elevated power level above the level of a legacy universal serial bus cable.

An example method comprises:

receiving at a second device a request from a first device requesting a function be performed to enable the first device to detect a cable indication of a cable connecting the first and second devices, the cable indication indicating whether the cable is capable of conducting an elevated power level above the level of a legacy cable;

performing the function to enable the first device to detect the cable indication;

receiving an offer from the first device connected by the cable, to provide one or more supported power capabilities above the level of a legacy cable, if the cable indication is determined to indicate that the cable is capable of conducting an elevated power level above the level of a legacy cable; and receiving an offer from the first device, to provide the power level of a legacy cable, if the cable indication is determined to indicate that the cable is not capable of conducting an elevated power level above the level of a legacy cable.

The example method further comprises:

determining whether a connector of the cable, includes a cable indication that indicates the cable is capable of conducting an elevated power level above a level of a legacy cable;

transmitting an acceptance to the first device, to accept a supported power capability above the level of a legacy cable, if the cable indication is determined to indicate that the cable is capable of conducting an elevated power level above the level of a legacy cable; and transmitting a selection of a power level of a legacy cable, to the first device, if the cable indication is determined to indicate that the cable is not capable of conducting an elevated power level above the level of a legacy cable.

The example method further comprises: wherein the first device is to be connected to the second device by a universal serial bus cable having a universal serial bus connector at an opposite end of the cable from the second device, the universal serial bus connector including a cable termination circuit having the cable indication that indicates whether the universal serial bus cable is capable of conducting an elevated power level above the level of a legacy universal serial bus cable.

An example apparatus, comprises:

at least one processor;

at least one memory including computer program code;

the at least one memory and the computer program code configured to, with the at least one processor, cause the apparatus at least to:

transmit a request by the apparatus requesting a function be performed by a second device to enable detecting a cable indication that indicates whether a cable connecting the apparatus and second devices is capable of conducting an elevated power level above a level of a legacy cable;

transmit a signal through the cable to a termination circuit in a connector of the cable and receiving a reflected signal in response from the termination circuit, which indicates the cable indication;

transmit an offer to the second device connected by the cable, to provide one or more supported power capabilities above the level of a legacy cable, if the cable indication is determined to indicate that the cable is capable of conducting an elevated power level above the level of a legacy cable; and transmit an offer to the second device, to provide the power level of a legacy cable, if the cable indication is determined to indicate that the cable is not capable of conducting an elevated power level above the level of a legacy cable.

The example apparatus further comprises:

the at least one memory and the computer program code configured to, with the at least one processor, cause the apparatus at least to:

receive an acceptance of the offer to the second device, to provide a supported power capability above the level of a legacy cable, if the cable indication is determined to indicate that the cable is capable of conducting an elevated power level above the level of a legacy cable; and receive an acceptance of the offer to the second device, to provide the power level of a legacy cable, if the cable indication is determined to indicate that the cable is not capable of conducting an elevated power level above the level of a legacy cable.

The example apparatus further comprises: wherein the apparatus is to be connected to the second device by a universal serial bus cable having a universal serial bus connector at an opposite end of the cable from the apparatus, the connector including a cable termination circuit having the cable indication that indicates whether the universal serial bus cable is capable of conducting an elevated power level above the level of a legacy universal serial bus cable.

An example apparatus comprises:

at least one processor;

at least one memory including computer program code;

the at least one memory and the computer program code configured to, with the at least one processor, cause the apparatus at least to:

receive at the apparatus a request from a first device requesting a function be performed to enable the first device to detect a cable indication of a cable connecting the first device and the apparatus, the cable indication indicating whether the cable is capable of conducting an elevated power level above the level of a legacy cable;

perform the function to enable the first device to detect the cable indication;

receive an offer from the first device connected by the cable, to provide one or more supported power capabilities above the level of a legacy cable, if the cable indication is determined to indicate that the cable is capable of conducting an elevated power level above the level of a legacy cable; and receive an offer from the first device, to provide the power level of a legacy cable, if the cable indication is determined to indicate that the cable is not capable of conducting an elevated power level above the level of a legacy cable.

The example apparatus further comprises:

the at least one memory and the computer program code configured to, with the at least one processor, cause the apparatus at least to:

determine whether a connector of the cable, includes a cable indication that indicates the cable is capable of conducting an elevated power level above a level of a legacy cable;

transmit an acceptance to the first device, to accept a supported power capability above the level of a legacy cable, if the cable indication is determined to indicate that the cable is capable of conducting an elevated power level above the level of a legacy cable; and transmit a selection of a power level of a legacy cable, to the first device, if the cable indication is determined to indicate that the cable is not capable of conducting an elevated power level above the level of a legacy cable.

The example apparatus further comprises: wherein the first device is to be connected to the apparatus by a universal serial bus cable having a universal serial bus connector at an opposite end of the cable from the second device, the universal serial bus connector including a cable termination circuit having the cable indication that indicates whether the universal serial bus cable is capable of conducting an elevated power level above the level of a legacy universal serial bus cable.

An example computer program product comprises computer executable program code recorded on a computer readable, non-transitory storage medium, the computer executable program code, when executed by a computer processor, performing the steps, comprising:

transmitting a request by a first device requesting a function be performed by a second device to enable detecting a cable indication that indicates whether a cable connecting the first and second devices is capable of conducting an elevated power level above a level of a legacy cable;

transmitting a signal through the cable to a termination circuit in a connector of the cable and receiving a reflected signal in response from the termination circuit, which indicates the cable indication;

transmitting an offer to the second device connected by the cable, to provide one or more supported power capabilities above the level of a legacy cable, if the cable indication is determined to indicate that the cable is capable of conducting an elevated power level above the level of a legacy cable; and transmitting an offer to the second device, to provide the power level of a legacy cable, if the cable indication is determined to indicate that the cable is not capable of conducting an elevated power level above the level of a legacy cable.

An example computer program product comprises computer executable program code recorded on a computer readable, non-transitory storage medium, the computer executable program code, when executed by a computer processor, performing the steps, comprising:

receiving at a second device a request from a first device requesting a function be performed to enable the first device to detect a cable indication of a cable connecting the first and second devices, the cable indication indicating whether the cable is capable of conducting an elevated power level above the level of a legacy cable;

performing the function to enable the first device to detect the cable indication;

receiving an offer from the first device connected by the cable, to provide one or more supported power capabilities above the level of a legacy cable, if the cable indication is determined to indicate that the cable is capable of conducting an elevated power level above the level of a legacy cable; and receiving an offer from the first device, to provide the power level of a legacy cable, if the cable indication is determined to indicate that the cable is not capable of conducting an elevated power level above the level of a legacy cable.

Using the description provided herein, the embodiments may be implemented as a machine, process, or article of manufacture by using standard programming and/or engineering techniques to produce programming software, firmware, hardware or any combination thereof.

Some or all of the steps in the flow diagrams disclosed herein may be embodied as hardware program logic included in programmed logic arrays of sequential and/or combinatorial logic circuits and/or state machine logic implementing some or all of the steps performed by embodiments of the invention.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable, non-transitory medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention. For instance, the features described herein may be employed to other interfaces that conduct beside data also power, such as for example Mobile High-Definition Link (MHL), High-Definition Multimedia Interface (HDMI) or FireWire, Ethernet (especially power over Ethernet), Serial Advanced Technology Attachment (SATA), DisplayPort and Thunderbolt.

What is claimed is:

1. A method, comprising:
   determining whether a connector includes a cable indication that indicates its cable is capable of conducting an elevated power level above a level of a legacy cable;
   transmitting an offer to a device connected by the cable, to provide one or more supported power capabilities above the level of a legacy cable, if the cable indication is determined to indicate that the cable is capable of conducting an elevated power level above the level of a legacy cable; and
   transmitting an offer to the connected device, to provide the power level of a legacy cable, if the cable indication is determined to indicate that the cable is not capable of conducting an elevated power level above the level of a legacy cable.

2. The method of claim 1, wherein a first device is to be connected to the connected device by the cable via a connector that includes a mark as the cable indication that indicates whether the cable is capable of conducting an elevated power level above the level of a legacy cable.

3. The method of claim 2, wherein the cable is a universal serial bus cable, the connector is a universal serial bus connector and the mark is formed by a hole in a shielding portion of the connector, which is filled with an insulating material whose presence indicates whether the universal serial bus cable is capable of conducting an elevated power level above the level of a legacy universal serial bus cable.

4. The method of claim 1, wherein a first device is to be connected to the connected device by the cable via a connector that includes an electronic marker as the cable indication that indicates whether the cable is capable of conducting an elevated power level above the level of a legacy cable.

5. The method of claim 4, wherein the cable is a universal serial bus cable, the connector is a universal serial bus connector and the electronic marker is a circuit in the connector, which is connected to indicate whether the universal serial bus cable is capable of conducting an elevated power level above the level of a legacy universal serial bus cable.

6. The method of claim 1, further comprising:
   receiving an acceptance from the connected device, to accept a supported power capability above the level of a legacy cable, if the cable indication is determined to indicate that the cable is capable of conducting an elevated power level above the level of a legacy cable; and
   receiving an acceptance from the connected device, of a power level of a legacy cable, if the cable indication is determined to indicate that the cable is not capable of conducting an elevated power level above the level of a legacy cable.

7. A method, comprising:
   receiving an offer from a first device connected by a cable, to provide one or more supported power capabilities above the level of a legacy cable;
   determining whether a connector of the cable, includes a cable indication that indicates the cable is capable of conducting an elevated power level above a level of a legacy cable;
   transmitting an acceptance to the first device, to accept a supported power capability above the level of a legacy cable, if the cable indication is determined to indicate that the cable is capable of conducting an elevated power level above the level of a legacy cable; and
   transmitting a selection of a power level of a legacy cable, to the first device, if the cable indication is determined to indicate that the cable is not capable of conducting an elevated power level above the level of a legacy cable.

8. The method of claim 7, wherein a second device is to be connected to the first device by the cable via a connector that includes a mark as the cable indication that indicates whether the cable is capable of conducting an elevated power level above the level of a legacy cable.

9. The method of claim 8, wherein the cable is a universal serial bus cable, the connector is a universal serial bus connector and the mark is formed by a hole in a shielding portion of the connector, which is filled with an insulating material whose presence indicates whether the universal serial bus cable is capable of conducting an elevated power level above the level of a legacy universal serial bus cable.

10. The method of claim 7, wherein a second device is to be connected to the first device by the cable via a connector that includes an electronic marker as the cable indication that indicates whether the cable is capable of conducting an elevated power level above the level of a legacy cable.

11. The method of claim 10, wherein the cable is a universal serial bus cable, the connector is a universal serial bus connector and the electronic marker is a circuit in the connector, which is connected to indicate whether the universal serial bus cable is capable of conducting an elevated power level above the level of a legacy universal serial bus cable.

12. An apparatus, comprising:
at least one processor;
at least one memory including computer program code;
the at least one memory and the computer program code configured to, with the at least one processor, cause the apparatus at least to:
determine whether a connector includes a cable indication that indicates its cable is capable of conducting an elevated power level above a level of a legacy cable;
transmit an offer to a device connected by the cable, to provide one or more supported power capabilities above the level of a legacy cable, if the cable indication is determined to indicate that the cable is capable of conducting an elevated power level above the level of a legacy cable; and
transmit an offer to a device connected by the cable, to provide the power level of a legacy cable, if the cable indication is determined to indicate that the cable is not capable of conducting an elevated power level above the level of a legacy cable.

13. The apparatus of claim 12, wherein the apparatus is to be connected to the connected device by the cable via a connector that includes a mark as the cable indication that indicates whether the cable is capable of conducting an elevated power level above the level of a legacy cable.

14. The apparatus of claim 13, wherein the cable is a universal serial bus cable, the connector is a universal serial bus connector and the mark is formed by a hole in a shielding portion of the connector, which is filled with an insulating material whose presence indicates whether the universal serial bus cable is capable of conducting an elevated power level above the level of a legacy universal serial bus cable.

15. The apparatus of claim 12, wherein the apparatus is to be connected to the connected device by the cable via a connector that includes an electronic marker as the cable indication that indicates whether the cable is capable of conducting an elevated power level above the level of a legacy cable.

16. The apparatus of claim 15, wherein the cable is a universal serial bus cable, the connector is a universal serial bus connector and the electronic marker is a circuit in the connector, which is connected to indicate whether the universal serial bus cable is capable of conducting an elevated power level above the level of a legacy universal serial bus cable.

17. The apparatus of claim 12, further comprising:
the at least one memory and the computer program code configured to, with the at least one processor, cause the apparatus at least to:
receive an acceptance from the connected device, to accept a supported power capability above the level of a legacy universal serial bus cable, if the cable indication is determined to indicate that the universal serial bus cable is capable of conducting an elevated power level above the level of a legacy universal serial bus cable; and
receive an acceptance from the connected device, of a power level of a legacy universal serial bus cable, if the cable indication is determined to indicate that the universal serial bus cable is not capable of conducting an elevated power level above the level of a legacy universal serial bus cable.

18. An apparatus, comprising:
at least one processor;
at least one memory including computer program code;
the at least one memory and the computer program code configured to, with the at least one processor, cause the apparatus at least to:
receive an offer from a first device connected by a cable, to provide one or more supported power capabilities above the level of a legacy cable;
determine whether a connector of the cable, includes a cable indication that indicates the cable is capable of conducting an elevated power level above a level of a legacy cable;
transmit an acceptance to the first device, to accept a supported power capability above the level of a legacy cable, if the cable indication is determined to indicate that the cable is capable of conducting an elevated power level above the level of a legacy cable; and
transmit a selection of a power level of a legacy cable, to the first device, if the cable indication is determined to indicate that the cable is not capable of conducting an elevated power level above the level of a legacy cable.

19. The apparatus of claim 18, wherein the apparatus is to be connected to the first device by the cable via a connector that includes a mark as the cable indication that indicates whether the cable is capable of conducting an elevated power level above the level of a legacy cable.

20. The apparatus of claim 19, wherein the cable is a universal serial bus cable, the connector is a universal serial bus connector and the mark is formed by a hole in a shielding portion of the connector, which is filled with an insulating material whose presence indicates whether the universal serial bus cable is capable of conducting an elevated power level above the level of a legacy universal serial bus cable.

21. The apparatus of claim 18, wherein the apparatus is to be connected to the first device by the cable via a connector that includes an electronic marker as the cable indication that indicates whether the cable is capable of conducting an elevated power level above the level of a legacy cable.

22. The apparatus of claim 18, wherein the cable is a universal serial bus cable, the connector is a universal serial bus connector and the electronic marker is a circuit in the connector, which is connected to indicate whether the universal serial bus cable is capable of conducting an elevated power level above the level of a legacy universal serial bus cable.

23. A computer program product comprising computer executable program code recorded on a computer readable, non-transitory storage medium, the computer executable program code, when executed by a computer processor, performing the steps, comprising:
- determining whether a connector includes a cable indication that indicates its cable is capable of conducting an elevated power level above a level of a legacy cable;
- transmitting an offer to a device connected by the cable, to provide one or more supported power capabilities above the level of a legacy cable, if the cable indication is determined to indicate that the cable is capable of conducting an elevated power level above the level of a legacy cable; and
- transmitting an offer to a device connected by the cable, to provide the power level of a legacy cable, if the cable indication is determined to indicate that the cable is not capable of conducting an elevated power level above the level of a legacy cable.

24. A computer program product comprising computer executable program code recorded on a computer readable, non-transitory storage medium, the computer executable program code, when executed by a computer processor, performing the steps, comprising:
- receiving an offer from a first device connected by a cable, to provide one or more supported power capabilities above the level of a legacy cable;
- determining whether a connector of the cable, includes a cable indication that indicates the cable is capable of conducting an elevated power level above a level of a legacy cable;
- transmitting an acceptance to the first device, to accept a supported power capability above the level of a legacy cable, if the cable indication is determined to indicate that the cable is capable of conducting an elevated power level above the level of a legacy cable; and
- transmitting a selection of a power level of a legacy cable, to the first device, if the cable indication is determined to indicate that the cable is not capable of conducting an elevated power level above the level of a legacy cable.

* * * * *